(12) United States Patent
Rolland et al.

(10) Patent No.: US 10,647,873 B2
(45) Date of Patent: *May 12, 2020

(54) DUAL CURE ARTICLE OF MANUFACTURE WITH PORTIONS OF DIFFERING SOLUBILITY

(71) Applicant: Carbon, Inc., Redwood City, CA (US)

(72) Inventors: Jason P. Rolland, San Carlos, CA (US); Nordstrom Kirk Phelps, San Carlos, CA (US); Ariel M. Herrmann, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 427 days.

This patent is subject to a terminal disclaimer.

(21) Appl. No.: 15/337,299

(22) Filed: Oct. 28, 2016

(65) Prior Publication Data

US 2017/0120515 A1    May 4, 2017

Related U.S. Application Data

(60) Provisional application No. 62/248,761, filed on Oct. 30, 2015.

(51) Int. Cl.
*C09D 135/02* (2006.01)
*B33Y 10/00* (2015.01)
(Continued)

(52) U.S. Cl.
CPC .......... *C09D 135/02* (2013.01); *B29C 64/124* (2017.08); *B29C 64/129* (2017.08);
(Continued)

(58) Field of Classification Search
CPC ........ B29C 64/124; B29C 67/00; B33Y 70/00
See application file for complete search history.

(56) References Cited

U.S. PATENT DOCUMENTS

| 3,442,974 A | 5/1969 | Bremmer |
| 3,454,621 A | 7/1969 | Engel, Jr. |

(Continued)

FOREIGN PATENT DOCUMENTS

| CN | 102715751 | 10/2012 |
| CN | 103571211 | 2/2014 |

(Continued)

OTHER PUBLICATIONS

Sigma Aldrich, Properties of Triphenylsulfonium Sulfate (Year: 2018).*

(Continued)

*Primary Examiner* — Peter L Vajda
*Assistant Examiner* — S. Behrooz Ghorishi
(74) *Attorney, Agent, or Firm* — Myers Bigel, P.A.

(57) ABSTRACT

Provided herein is a polymerizable liquid composition useful for additive manufacturing, which composition may include: (i) a free radical photoinitiator; (ii) monomers and/or prepolymers (e.g., reactive diluents) that are polymerizable by exposure to actinic radiation or light, optionally wherein some or all of said monomers and/or prepolymers comprise one or more acid-labile groups; (iii) a chain extender, optionally wherein said chain extender comprises one or more acid-labile groups; and (iv) a photoacid generator, wherein at least one of said monomers and/or prepolymers, or said chain extender, comprises one or more acid-labile groups, and wherein said free radical photoinitiator and said photoacid generator are, or are selected to be, activated by light at different ranges of wavelengths or intensities. Methods of forming a three-dimensional object with the composition, and articles so formed are also provided. Methods of removing a portion of the article by dissolving in a polar or non-polar solvent are further provided.

26 Claims, 9 Drawing Sheets

(51) Int. Cl.
*B33Y 70/00* (2020.01)
*C09D 175/16* (2006.01)
*C08G 18/67* (2006.01)
*C08G 18/32* (2006.01)
*B33Y 80/00* (2015.01)
*B29C 64/129* (2017.01)
*B29C 64/124* (2017.01)
*C09D 4/06* (2006.01)

(52) U.S. Cl.
CPC ............... *B33Y 10/00* (2014.12); *B33Y 70/00* (2014.12); *B33Y 80/00* (2014.12); *C08G 18/3206* (2013.01); *C08G 18/672* (2013.01); *C09D 4/06* (2013.01); *C09D 175/16* (2013.01)

(56) References Cited

U.S. PATENT DOCUMENTS

| | | | |
|---|---|---|---|
| 3,947,688 | A | 3/1976 | Massey |
| 4,501,993 | A | 2/1985 | Mueller et al. |
| 5,017,461 | A | 5/1991 | Abe |
| 5,182,056 | A | 1/1993 | Spence et al. |
| 5,236,637 | A | 8/1993 | Hull |
| 5,264,061 | A | 11/1993 | Juskey et al. |
| 5,318,751 | A * | 6/1994 | Vo-Dinh ............... G01N 21/75 422/82.08 |
| 5,374,500 | A | 12/1994 | Carpenter, Jr. et al. |
| 5,629,133 | A | 5/1997 | Wolf et al. |
| 5,674,921 | A | 10/1997 | Regula et al. |
| 5,679,719 | A | 10/1997 | Klemarczyk et al. |
| 5,695,708 | A | 12/1997 | Karp et al. |
| 5,745,284 | A | 4/1998 | Goldberg et al. |
| 6,309,797 | B1 * | 10/2001 | Grinevich ............... B29C 35/08 430/270.1 |
| 6,692,891 | B2 | 2/2004 | Jung et al. |
| 6,876,689 | B2 | 4/2005 | Walling et al. |
| 7,438,846 | B2 | 10/2008 | John |
| 7,534,844 | B2 | 5/2009 | Lee et al. |
| 7,550,246 | B2 | 6/2009 | Fukuzumi et al. |
| 7,649,029 | B2 | 1/2010 | Kolb et al. |
| 7,767,728 | B2 | 8/2010 | Lu et al. |
| 7,815,835 | B2 | 10/2010 | Stampfl et al. |
| 7,824,839 | B2 | 11/2010 | Ober et al. |
| 7,848,381 | B2 | 12/2010 | Barnes et al. |
| 7,935,476 | B2 | 5/2011 | Teng |
| 7,993,749 | B2 | 8/2011 | Berkland et al. |
| 8,110,135 | B2 | 2/2012 | El-Siblani |
| 8,119,214 | B2 | 2/2012 | Schwantes et al. |
| 8,232,043 | B2 | 7/2012 | Williamson et al. |
| 8,617,787 | B2 | 12/2013 | Suzuki et al. |
| 8,685,616 | B2 | 4/2014 | Gonsalves et al. |
| 8,822,590 | B2 | 9/2014 | Hermes et al. |
| 9,120,270 | B2 | 9/2015 | Chen et al. |
| 9,211,678 | B2 | 12/2015 | Desimone et al. |
| 9,453,142 | B2 | 9/2016 | Rolland et al. |
| 9,777,097 | B2 | 1/2017 | Liu et al. |
| 9,598,606 | B2 | 3/2017 | Rolland et al. |
| 9,676,963 | B2 | 6/2017 | Rolland et al. |
| 9,708,440 | B2 | 7/2017 | Das et al. |
| 9,982,164 | B2 | 5/2018 | Rolland et al. |
| 2002/0054613 | A1 | 5/2002 | Kang |
| 2003/0091833 | A1 | 5/2003 | Baumgart et al. |
| 2004/0052966 | A1 | 3/2004 | Wilke et al. |
| 2004/0187714 | A1 | 9/2004 | Napadensky et al. |
| 2007/0178133 | A1 | 8/2007 | Rolland |
| 2007/0205528 | A1 | 9/2007 | Patel et al. |
| 2007/0231735 | A1 | 10/2007 | Pawlowski et al. |
| 2008/0131692 | A1 * | 6/2008 | Rolland ............... B29C 33/40 428/336 |
| 2010/0022709 | A1 | 1/2010 | Jin et al. |
| 2010/0105794 | A1 | 4/2010 | Dietliker et al. |
| 2011/0076353 | A1 * | 3/2011 | Shirai ............... B29C 33/3857 425/385 |
| 2012/0195994 | A1 * | 8/2012 | El-Siblani ............... B33Y 10/00 425/174.4 |
| 2012/0251841 | A1 | 10/2012 | Southwell et al. |
| 2012/0259031 | A1 * | 10/2012 | Dake ............... G03F 7/0037 522/11 |
| 2013/0196153 | A1 | 8/2013 | Weikel et al. |
| 2013/0292862 | A1 | 11/2013 | Joyce |
| 2015/0072293 | A1 * | 3/2015 | DeSimone ............ B33Y 10/00 430/322 |
| 2015/0097315 | A1 | 4/2015 | Desimone et al. |
| 2015/0097316 | A1 | 4/2015 | Desimone et al. |
| 2015/0322291 | A1 | 11/2015 | Salviato et al. |
| 2016/0160077 | A1 | 6/2016 | Rolland et al. |
| 2017/0151718 | A1 | 6/2017 | Rolland et al. |
| 2017/0239887 | A1 | 8/2017 | Rolland et al. |

FOREIGN PATENT DOCUMENTS

| | | |
|---|---|---|
| EP | 0442071 | 8/1991 |
| EP | 0525578 | 2/1993 |
| EP | 0830641 | 3/1998 |
| EP | 1341039 | 9/2003 |
| EP | 1918316 | 5/2008 |
| EP | 2224874 | 9/2010 |
| JP | H02111528 | 4/1990 |
| JP | 2012210408 | 11/2012 |
| WO | 2001/026023 | 4/2001 |
| WO | 2006/045002 | 4/2006 |
| WO | 2012129968 | 10/2012 |
| WO | 2015/077419 | 5/2015 |

OTHER PUBLICATIONS

Sigma Aldrich, research article about Applications: Free Radical Photoinitiators (Year: 2018).*

Hye Young Koo et al., "UV-triggered encapsulation and release from polyelectrolyte microcapsules decorated with photoacid generators", Journal of Materials Chemistry, 20, 3932-3937. (Year: 2010).*

5000-EC Series UV Curing Flood Lamp Systems—Brochure, Dymax®, https://www.dymax.com/index.php/curing-systems/flood-lamps/flood-lamps-5000-ec-series (3 pages) (2016).

Binauld et al. "Acid-degradable polymers for drug delivery: a decade of innovation" Chemical Communications 49:2082-2102 (2013).

Decker "Light-induced crosslinking polymerization" Polymer International 51:1141-1150 (2002).

Education in Microscopy and Digital Imaging "Fundamentals of Mercury Arc Lamps"—Zeiss Microscopy Online Campus, http://zeiss-campus.magnet.fsu.edu/articles/lightsources/mercuryarc.html (6 pages).

Green "Appendix A: Tables and Absorbance Graphs" Industrial Photoinitiators: A technical guide (CRC Press): pp. 175-240 (2010).

Green "Commercial Photoinitiators" Industrial Photoinitiators: A technical guide (CRC Press): pp. 30-31 (2010).

International Search Report and Written Opinion for PCT/US2016/051515 dated Jan. 25, 2017, 15 pages.

Marrion et al. "Binders for Conventional Coatings" The Chemistry and Physics of Coatings: Edition 2, Chapter 6:96-150 (Oct. 12, 2004).

Marrion et al. "Binders for High Solids and Solvent-free Coatings" The Chemistry and Physics of Coatings: Edition 2, Chapter 7:151-200 (Oct. 12, 2004).

Marrion. The Chemistry and Physics of Coatings: Edition 2. Cambridge: Royal Society of Chemistry, 2004. Print.

Photoacid Generator Selection Guide for the electronics industry and energy curable coatings—Brochure, BASF Corporation, http://docplayer.net/35330318-Photoacid-generator-selection-guide-for-the-electronics-industry-and-energy-curable-coatings.html (16 pages) (2010).

Photoacid Generator Selection Guide for the electronics industry and energy curable coatings—Product Selection Guide, BASF Corporation, http://businessdocbox.com/Metals/68783175-Photoacid-generator-selection-guide-for-the-electronics-industry-and-energy-curable-coatings.html (16 pages) (2014).

(56) References Cited

OTHER PUBLICATIONS

Photoinitiators for UV Curing—Key Products Selection Guide 2003, Ciba Specialty Chemicals, https://people.rit.edu/deeemc/reference_13/Imprint/Photoinitiators%20for%20UV%20curing.pdf (8 pages) (2003).
Specifications for UV LED—Nichia Corporation, https://www.nichia.co.jp/specification/products/led/NVSU333A-E.pdf (23 pages).
Tumbleston et al. "Continuous liquid interface production of 3D Objects" Science 347(6228):1349-1352 (Mar. 20, 2015).
Arceneaux JA and Willard K. UV&EB Chemistry and Technology. RadTech Printer's Guide. Downloaded 2015, 8 pages.
Thermoplastic polyurethane. Wikipedia. https://en.wikipedia.org/wiki. Downloaded Aug. 12, 2015, 2 page.
Lee JM et al. Thermal decomposition behavior of blocked diisocyanates derived from mixture of blacking agents. Macromolecular Research. 2005; 13(5): 427-434.
Interpenetrating polymer network. Wikipedia. https://en.wikipedia.org/wiki. Downloaded Sep. 22, 2015, 2 pages.
Park et al., UV- and thermal-curing behaviors or dual-curable adhesives based on epoxy acrylate oligomers, International Journal of Adhesion and Adhesives, vol. 29, Issue 7, 2009, pp. 710-717.
Malik et al. "A thermally reworkable UV curable acrylic adhesive prototype" International Journal of Adhesion & Adhesives, 22: 283-289 (2002).
Malik et al. "Thermally Controlled Molecular Disassembly of a Crosslinked Polymer Network by the Incorporation of Sterically Hindered Urea Linkages" Journal of Applied Polymer Science, 85: 856-864 (2002).
Malik et al. "The thermally controlled molecular disassembly properties of a polymer network via the incorporation of one sterically hindered urea linkage" Polymer Degradation and Stability, 76: 241-249 (2002).
Malik et al. "Computational study of thermally controlled polymer network disassembly via the incorporation of sterically hindered urea linkages" Polymer, 43: 2561-2567 (2002).
Malik et al. "Comparative Study of Novel Polymer Prototype for Controlled Thermally Reworkable UV Curable Acrylic Adhesives in Absence and Presence of Reactive Diluent" Surface Engineering, 19(2): 121-126 (2003).

\* cited by examiner

DUAL CURE ARTICLE OF MANUFACTURE WITH PORTIONS OF DIFFERING SOLUBILITY

RELATED APPLICATIONS

This application claims the benefit of U.S. Provisional Patent Application Ser. No. 62/248,761 filed Oct. 30, 2015, the disclosure of which is incorporated by reference herein in its entirety.

BACKGROUND

Three-dimensional printed parts produced with resins often require the use of supports in order to print fine/delicate structures and overhangs. A significant amount of effort is then needed post-printing to remove the supports, by clipping or sawing, and to sand down the small bumps remaining after the support has been removed. This processing can be difficult if the part is made of a tough resin that is resistant to cutting and sanding, is an elastomeric resin that is difficult to sand, and/or has an intricate shape that makes it challenging to cut or sand.

There is, therefore, a need to produce three-dimensional printed objects such as elastomeric articles having supports that can be more easily removed, such as by dissolving or melting.

SUMMARY

Provided herein is a polymerizable liquid composition useful for additive manufacturing, which composition may include: (i) a free radical photoinitiator; (ii) monomers and/or prepolymers (e.g., reactive diluents) that are polymerizable by exposure to actinic radiation or light, optionally wherein some or all of said monomers and/or prepolymers comprise one or more acid-labile groups; (iii) a chain extender, optionally wherein said chain extender comprises one or more acid-labile groups; and (iv) a photoacid generator, wherein at least one of said monomers and/or prepolymers, or said chain extender, comprises one or more acid-labile groups, and wherein said free radical photoinitiator and said photoacid generator are, or are selected to be, activated by light at different ranges of wavelengths or intensities.

In some embodiments, the different ranges of wavelengths or intensities may be selected such that there is a wavelength at which the free radical photoinitiator is activated and the photoacid generator is not activated (or not appreciably activated). In some embodiments, the free radical photoinitiator and the photoacid generator have spectra with a peak activation wavelength that is at least 5 or 10 nm apart from one another. In some embodiments, the free radical photoinitiator is activated at wavelengths 250-600 nm (or any sub-range therein), and the photoacid generator is activated at wavelengths 250-375 nm (or any sub-range therein).

Further provided is a method of forming a three-dimensional object intermediate comprising an acidic region, which method may include some or all of the steps of: (a) providing the polymerizable liquid composition having a photoacid generator as taught herein; (b) polymerizing a build region of said polymerizable liquid composition to form a crosslinked polymer, wherein said polymerizing is carried out by irradiating said polymerizable liquid with light at a first wavelength or intensity; and (c) activating the photoacid generator by further irradiating a portion of the build region intended or selected to be acidic with light at a second wavelength or intensity, whereby the photoacid generator produces acid in said portion of the crosslinked polymer to thereby form said acidic region, to thereby form said three-dimensional object intermediate comprising an acidic region.

In some embodiments, the first wavelength is produced by a first light source, and the second wavelength is produced by a second light source, each having an emission peak wavelength that is at least 5 or 10 nm apart from one another.

In some embodiments, the first wavelength and the second wavelength are produced by the same light source, being configured to produce a first or second emission peak wavelength that is at least 5 or 10 nm apart (e.g., with UV filters and/or rapid lamp and/or mirror switching time).

In some embodiments, the forming is carried out by additive manufacturing (e.g., bottom-up or top-down three-dimensional fabrication). In some embodiments, the forming is carried out by continuous liquid interface production (CLIP).

In some embodiments, the method also includes the step of: (d) heating the acidic region of the three-dimensional object to a temperature of from 40 degrees Celsius to 250 degrees Celsius (or any subrange therein), whereby the crosslinked polymer of said three-dimensional object intermediate further reacts with the chain extenders to form a three-dimensional object (e.g., an elastomeric 3D object), and acid of the acidic region reacts with the acid-labile groups to form reacted groups.

In some embodiments, the reacted groups comprise polar or non-polar moieties, said moieties conferring a difference in solubility as compared to a non-acidic region of the three-dimensional object.

In some embodiments, the reacted groups confer a different melting temperature ($T_m$) or glass transition temperature ($T_g$) to the acidic region as compared to a non-acidic region of the three-dimensional object.

Also provided is a method of forming a three-dimensional object intermediate comprising an acidic region, which method may include some or all of the steps of: (a) providing a carrier and a build plate, said build plate comprising a build surface with said build surface and said carrier defining a build region therebetween; (b) filling said build region with the polymerizable liquid composition comprising a photoacid generator as taught herein, said polymerizable liquid composition contacting said build surface; (c) polymerizing said polymerizable liquid composition to form a crosslinked polymer, wherein said polymerizing is carried out by irradiating said build region through said build plate with light at a first wavelength or intensity to activate the free radical photoinitiator and polymerize the photopolymerizable monomer to form a polymer, thereby forming a crosslinked polymer in said build region; (d) activating the photoacid generator by further irradiating a portion of the build region intended to be acidic through said build plate with light at a second wavelength or intensity, whereby the photoacid generator produces acid in said crosslinked polymer to thereby form said acidic region; and (e) advancing said carrier with said crosslinked polymer adhered thereto away from said build surface on said build plate to create a subsequent build region between said crosslinked polymer and said build surface; to thereby form said three-dimensional object intermediate comprising an acidic region.

In some embodiments, the method also includes the step of: (f) heating the acidic region of the three-dimensional object, wherein the crosslinked polymer of said three-dimensional object intermediate further reacts with the chain extenders to form a three-dimensional object (e.g., an elastomeric 3D object), and acid of the acidic region reacts with the acid-labile groups to form reacted groups.

In some embodiments, the reacted groups comprise polar or non-polar moieties conferring a difference in solubility as compared to a non-acidic region of the three-dimensional object.

In some embodiments, the reacted groups confer a different melting temperature ($T_m$) or glass transition temperature ($T_g$) to the acidic region as compared to a non-acidic region of the three-dimensional object.

Further provided is a method of forming a three-dimensional object intermediate comprising an acidic region, the method comprising some or all of the steps of: (a) providing a carrier and a build plate, said build plate comprising a semipermeable member, said semipermeable member comprising a build surface with said build surface and said carrier defining a build region therebetween, and with said build surface in fluid communication by way of the semipermeable member with a source of polymerization inhibitor; (b) filling said build region with the polymerizable liquid composition comprising a photoacid generator as taught herein, said polymerizable liquid composition contacting said build surface; (c) polymerizing said polymerizable liquid composition to form a crosslinked polymer, wherein said polymerizing is carried out by irradiating said build region through said build plate with light at a first wavelength or intensity to activate the free radical photoinitiator, polymerize the photopolymerizable monomer to form a polymer, and crosslink the polymer with said crosslinker, thereby forming a crosslinked polymer in said build region, while forming or maintaining a liquid film release layer comprised of said polymerizable liquid composition formed between said crosslinked polymer and said build surface, the polymerization of which liquid film is inhibited by said polymerization inhibitor; (d) activating the photoacid generator by further irradiating a portion of the build region intended to be acidic through said build plate with light at a second wavelength or intensity, whereby the photoacid generator produces acid in said crosslinked polymer to thereby form said acidic region, while forming or maintaining a liquid film release layer comprised of said polymerizable liquid composition formed between said crosslinked polymer and said build surface, the polymerization of which liquid film is inhibited by said polymerization inhibitor; and (e) advancing said carrier with said crosslinked polymer adhered thereto away from said build surface on said build plate to create a subsequent build region between said crosslinked polymer and said build surface; to thereby form a three-dimensional object intermediate comprising an acidic region.

In some embodiments, the method further includes the step of: (f) heating the three-dimensional object, wherein the crosslinked polymer of said three-dimensional object intermediate further reacts with the chain extenders to form a three-dimensional object (e.g., an elastomeric 3D object), whereby acid of the acidic region reacts with the acid-labile groups to form reacted groups.

In some embodiments, the reacted groups comprise polar or non-polar moieties conferring a difference in solubility as compared to a non-acidic region of the three-dimensional object.

In some embodiments, the reacted groups confer a different melting temperature ($T_m$) or glass transition temperature ($T_g$) to the acidic region as compared to a non-acidic region of the three-dimensional object.

Further provided is an article of manufacture produced by a method of three-dimensional fabrication as taught herein.

Still further provided is an article of three-dimensional additive manufacture, said article comprising a photopolymerized polymer intermediate comprising at least one, or a plurality of, acidic regions, and at least one, or a plurality of, non-acidic regions, wherein the regions are integrally formed with one another and/or the article is a unitary member.

In some embodiments, the acidic regions are soluble in an aqueous solution, and the non-acidic regions are not soluble or less soluble in the aqueous solution.

In some embodiments, the acidic regions comprise a support structure or a portion thereof. In some embodiments, the acidic regions comprise a raft or a portion thereof. In some embodiments, the acidic regions comprise less than half of the total volume of the article.

Further provided is a method of removing a portion of an article of three-dimensional additive manufacture, comprising: providing an article having at least one, or a plurality of, acidic regions; and heating the article, whereby acid of the acidic region reacts with the acid-labile groups to form reacted groups, wherein the reacted groups comprise polar or non-polar moieties conferring a difference in solubility as compared to a non-acidic region of the three-dimensional object; and then, dissolving the acidic region in a polar or non-polar solvent, thereby removing the portion of the article of three-dimensional additive manufacture.

BRIEF DESCRIPTION OF THE DRAWINGS

FIG. 1A provides an example graph in which the PI and PAG have non-overlapping activation (absorbance) ranges.

FIG. 1B provides an example graph of PI and PAG having overlapping activation ranges.

FIG. 1C provides an example graph in which the PI and PAG have non-overlapping activation (absorbance) ranges, with the activation range of PAG is at a lower range of wavelengths than the activation range of PI.

FIG. 1D provides another example graph of PI and PAG having overlapping activation ranges.

FIG. 1E provides an example graph in which the PI and PAG have overlapping activation ranges, with the PI having a tail in the higher wavelengths.

FIG. 1F shows an example graph in which the activation range of the PAG is wholly within the activation range of the PI.

FIG. 1G shows another example graph in which the activation wavelength range of the PAG is wholly within the activation wavelength range of the PI.

The chain extender could have more than two functional groups to generate a crosslinked structure, if desired.

Figure 3:
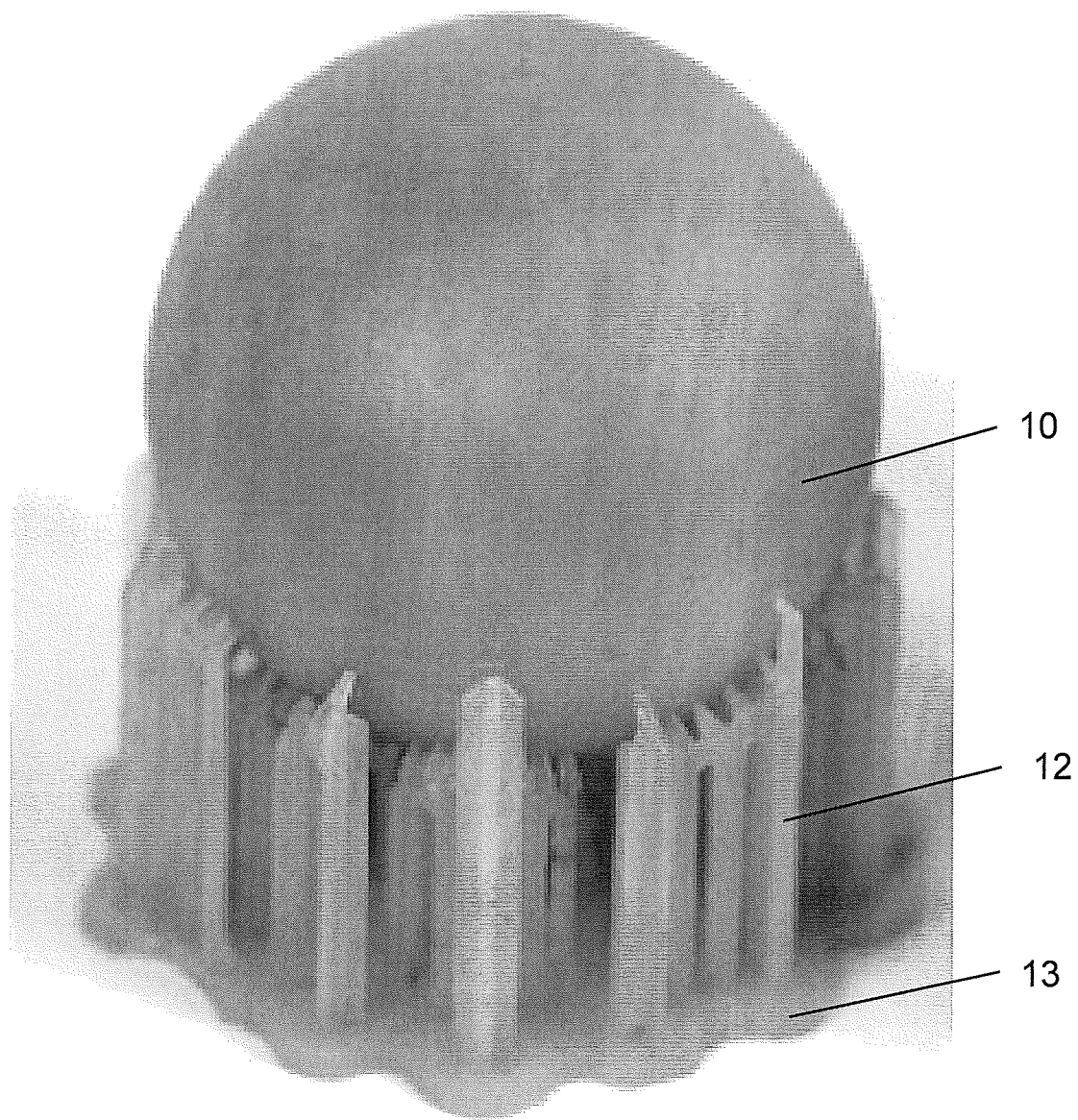

FIG. 3 is a photograph of an example additive manufacturing product or article (10), a ball, which has a rounded surface that is manufactured with supports (12) and on a raft (13). The supports and raft are removed after fabrication.

Figure 4A:
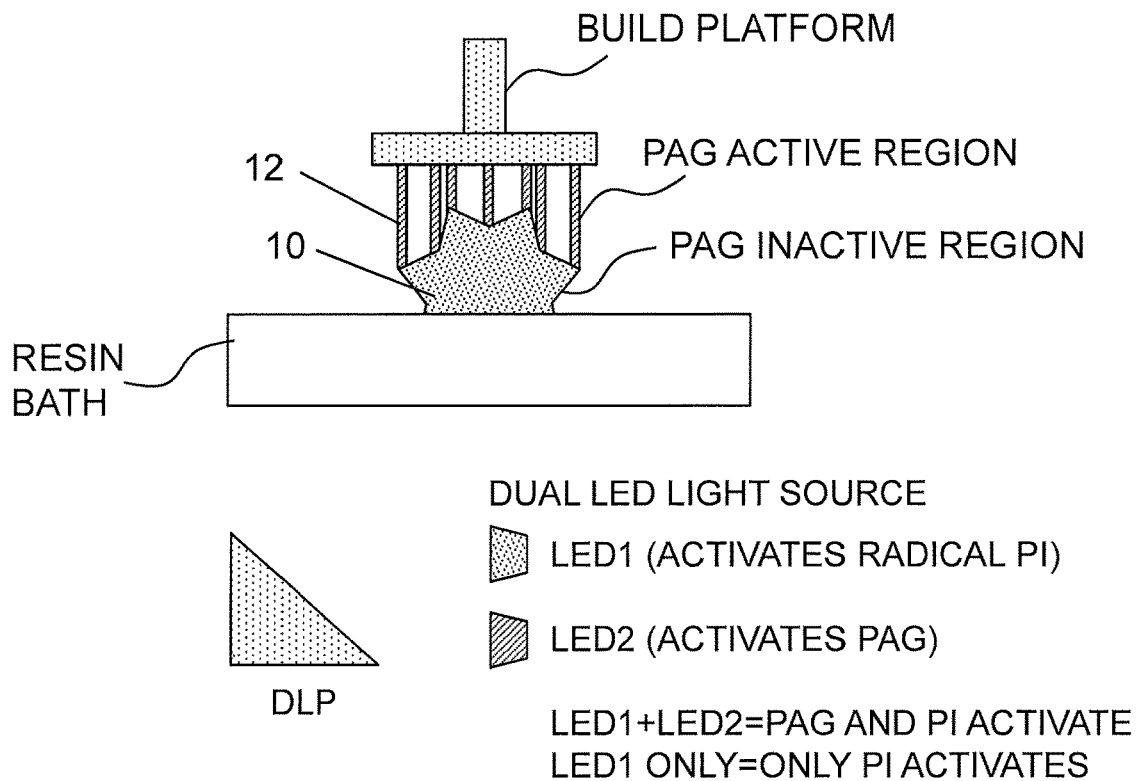
Figure 4B:
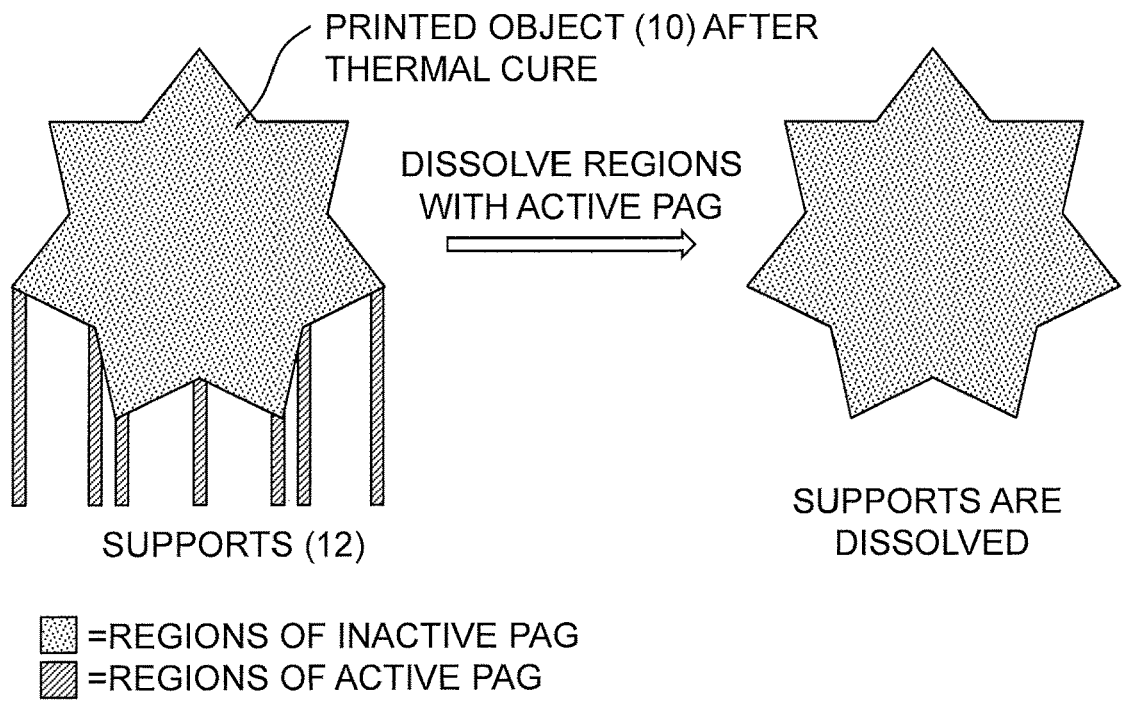

FIGS. 4A-4B present a schematic of additive manufacturing of an article intermediate using a dual LED light source for printing an object having a PAG-active acidic region (FIG. 4A), with subsequent dissolving of the PAG-active regions after thermal cure (FIG. 4B).

Figure 5:
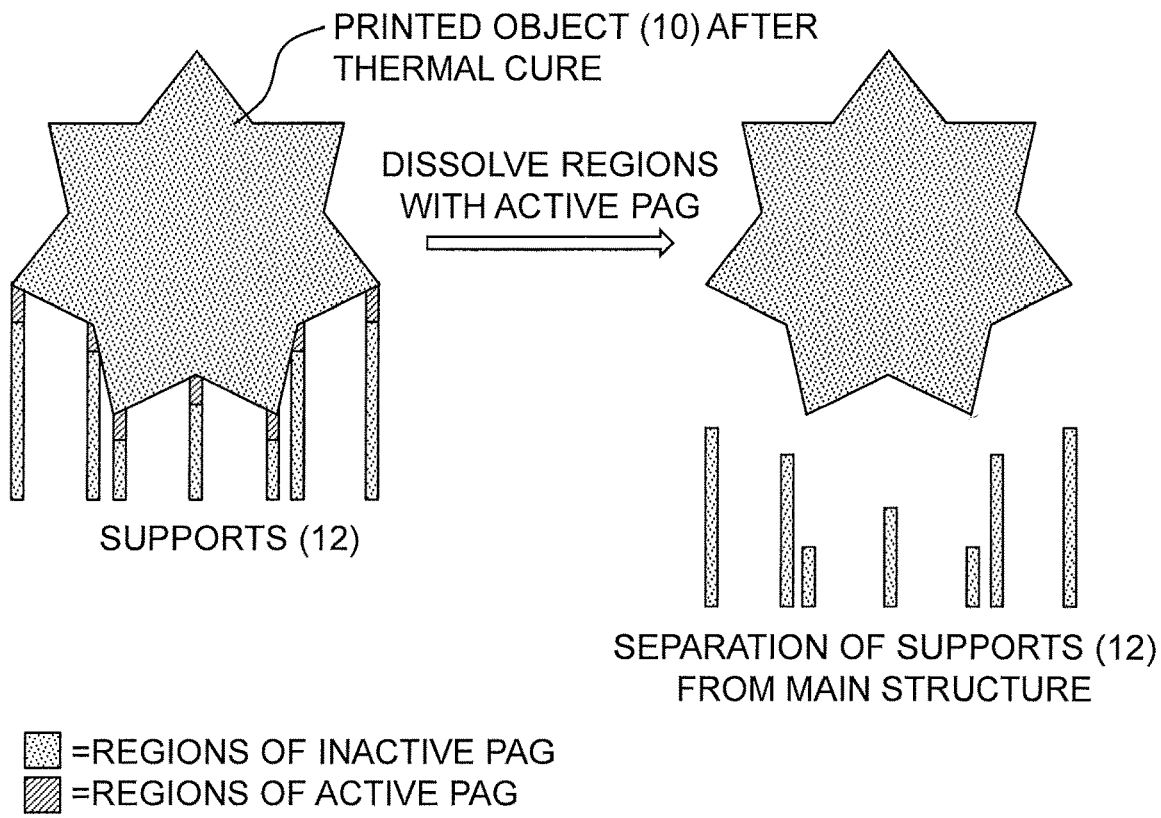

FIG. 5 shows a schematic of an example article (10) having PAG-active acidic regions at the point of contact of the supports (12). The supports are removed by dissolving the PAG-active regions.

Figure 6:
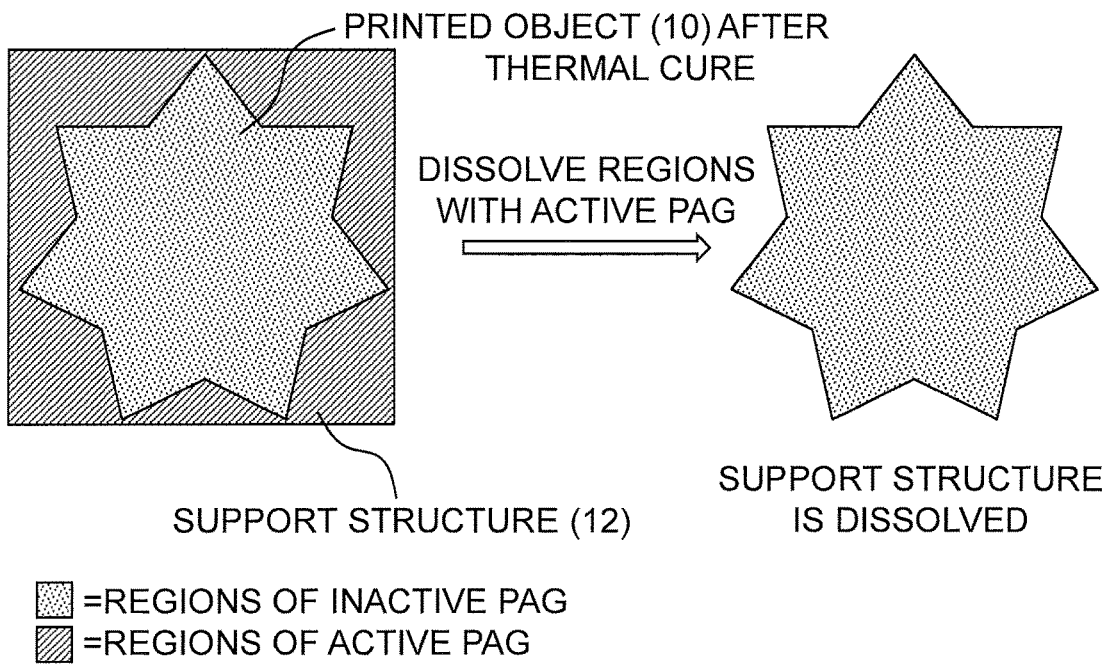

FIG. 6 shows a schematic of an example article (10) having a "brick" of cured material where a shape is defined by the regions of inactive PAG and active PAG. Regions of active PAG in the support structure (12) are dissolved after thermal cure to produce the shaped article.

DETAILED DESCRIPTION

The present disclosure relates to compositions and methods useful for creating objects by additive manufacturing such as stereolithography and related processes such as Continuous Liquid Interface Production (CLIP), in which the objects have portions of differing solubility and/or melting or glass transition temperatures (e.g., where the object is connected to supports).

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Polymerizable liquid compositions.

Polymerizable liquid compositions curable by actinic radiation (typically light, and in some embodiments ultraviolet (UV) light) are provided to enable the present invention. The liquid (sometimes referred to as "liquid resin," "ink," or simply "resin" herein) may include a polymerizable monomer, particularly photopolymerizable and/or free radical polymerizable monomers (e.g., reactive diluents) and/or prepolymers (i.e., reacted or larger monomers capable of further polymerization), and a suitable initiator such as a free radical initiator. Examples of liquid resins, monomers and initiators include, but are not limited to, those set forth in U.S. Pat. Nos. 8,232,043; 8,119,214; 7,935,476; 7,767,728; 7,649,029; WO 2012129968 A1; CN 102715751 A; JP 2012210408 A. In some embodiments, the monomer and/or prepolymer has one or more acid-labile groups.

As noted above, in some embodiments, the photopolymerizable monomer may be a reactive diluent. Diluents as known in the art are compounds used to reduce viscosity in a resin composition. Reactive diluents undergo reaction to become part of the polymeric network. In some embodiments, the reactive diluent may react at approximately the same rate as other reactive monomers and/or prepolymers in the composition. Reactive diluents may include aliphatic reactive diluents, aromatic reactive diluents, and cycloaliphatic reactive diluents. Examples include, but are not limited to, isobornyl acrylate, isobornyl methacrylate, lauryl acrylate, lauryl methacrylate, 2-ethyl hexyl methacarylate, 2-ethyl hexyl acrylate, di(ethylene glycol) methyl ether methacrylate, phenoxyethyl methacrylate, hydroxyethyl acrylate, hydroxyethyl methacrylate, dimethyl(aminoethyl) methacrylate, butyl acrylate, butyl methacrylate, cyclohexyl methacrylate, tetrahydrofurfuryl methacrylate, and tert-butylaminoethyl methacrylate.

Photopolymerizable prepolymers. Examples of photopolymerizable prepolymers include isocyanate or blocked isocynate-containing prepolymers. As noted above, in some embodiments, the prepolymer has one or more acid-labile groups. Such groups may form moieties having differing solubilities and/or melting temperatures when cleaved by the acid.

As known in the art, a blocked isocyanate is a group that can be deblocked or is otherwise available for reaction as an isocyanate upon heating, such as by a urethane reaction of an isocyanate with alcohol. See, e.g., U.S. Pat. No. 3,442,974 to Bremmer; U.S. Pat. No. 3,454,621 to Engel; Lee et al., "Thermal Decomposition Behaviour of Blocked Diisocyanates Derived from Mixture of Blocking Agents," *Macromolecular Research,* 13(5):427-434 (2005).

In some embodiments, the isocyanate may be blocked with an amine methacrylate blocking agent (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), maleimide, and mixtures thereof (see, e.g., US Patent Application Publication No. 20130202392)). Note that these could be used as diluents, as well.

Free radical photoinitiators. Free radical photoinitiators are known in the art. These initiators absorb energy in varying ranges in the UV spectrum (100-450 nm), including UV A (320-400 nm), UV B (280-320 nm), UV C (200-280 nm), deep UV (100-200 nm) and near-visible UV (400-450 nm, also known as UV-VIS) and produce a free radical reactive species, which then initiates polymerization of the polymerizable monomers. See, e.g., W. Arther Green, "Industrial Photoinitators: A Technical Guide," CRC Press, 2010. In some embodiments, the free radical photoinitiators are activated in the visible spectrum, i.e., up to 600 or 700 nm.

Photoinitiators activated in various areas of the UV spectrum are known, and may include, but are not limited to, Type I photoinitiators such as hydroxyacetophenones (HAPs), benzil ketals (BKs), alkylaminoacetophenones (AAAPs), phosphine oxides (POs), such as TPO (diphenyl (2,4,6-trimethylbenzoyl)-phosphine oxide, e.g., Darocure TPO, Irgacure TPO, Lucrin TPO), etc.; and Type II photoinitiators such as benzophenones, substituted benzophenones, anthraquinones, thioxanthones, etc. Free radical photoinitiators may include, but are not limited to, alpha-hydroxyketones, phenylglyoxylates, benzyldimethyl-ketals, alpha-aminoketones, mono acyl phosphines (MAPOs), bis acyl phosphines (BAPOs), metallocenes, iodinium salts, combinations thereof, etc. See *Photoinitiators for UV Curing, Key Products Selection Guide* 2003, Ciba Specialty Chemicals Inc., Basel, Switzerland.

In some embodiments, the free radical photoinitiator is selected to have an absorption spectrum that is not coextensive with the absorption spectrum of the photoacid generator in the composition. In some embodiments, the free radical photoinitiator is activated in a higher-energy section of the UV spectrum (i.e., shorter wavelengths), and the photoacid generator is activated in a lower-energy section of the UV spectrum (i.e., longer wavelengths). In some embodiments, the free radical photoinitiator is activated in a lower-energy section of the UV spectrum (i.e., longer wavelengths), and the photoacid generator is activated in a higher-energy section of the UV spectrum (i.e., shorter wavelengths).

For example, hydroxyacetophenones (HAPs) absorb at about 240-260 nm; e.g., Darocur 1173 absorbs at about 244; Irgacure 907 absorbs at about 306 nm; and Irgacure 369 absorbs at about 325 nm. Benzophenone absorbs at about 254 nm; while substituted benzophonone Speedcure PBZ absorbs at about 288 nm; and Speedcure BMS absorbs at about 315 nm. See also *Photoinitiators for UV Curing, Key Products Selection Guide* 2003, Ciba Specialty Chemicals Inc., Basel, Switzerland, providing absorption spectra for Irgacure and Darocure photoinitiators.

In some embodiments, the free radical photoinitiator is selected to have an activation intensity at one or more wavelengths that is not coextensive with the activation intensity of the photoacid generator in the composition. In some embodiments, the free radical photoinitiator is activated at a lower intensity than the photoacid generator. See FIG. 1H.

Chain extenders. Chain extenders are generally linear compounds having di- or poly-functional ends that can react with a monomer/prepolymer or crosslinked photopolymerized polymer intermediate as taught herein. Examples include, but are not limited to, diol chain extenders, which can react with isocyanates of a de-blocked diisocynate-containing polymer.

Examples of diol or polyol chain extenders include, but are not limited to, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, hydroquinone bis (2-hydroxyethyl) ether (HQEE), glycerol, trimethylolpropane, 1,2,6-hexanetriol, and pentaerythritol.

Natural oil polyols (biopolyols) may also be used. Such polyols may be derived, e.g., from vegetable oils (triglycerides), such as soybean oil, by known techniques. See, e.g., U.S. Pat. No. 6,433,121 to Petrovic et al.

Crosslinks. Crosslinks serve to join two or more polymer chains through covalent attachment or non-covalent (e.g., ionic) attraction. The crosslinks may be created from moieties reactive at one or more than one end (e.g., containing unsaturated vinyl moieties), or may be provided as part of the polymerizable monomer, prepolymer, or poly-functional chain extender chemical structure. In some embodiments, the crosslinks have acid-labile group(s).

Acid-labile groups. In some embodiments, the polymerizable liquid composition comprises moieties having an acid-labile group suitable for acid-mediated cleavage. Such acid-labile groups may be selected by one of skill in the art in view of the overall predicted structure of the formed polymer, and may include groups such as orthoester, tertiary ester, acetal, ketal, hydrazone, imine, cis aconityl, trityl, silyl ester, carbamate, tert-butyloxycarbonyl, tosyl group, etc. See, e.g., Binauld and Stenzel, "Acid-degradable polymers for drug delivery: a decade on innovation," *Chem. Commun.* 49: 2082-2102, 2013; U.S. Pat. No. 7,993,749. In some embodiments, the acid-labile group may be cleavable as part of a chemical amplification. As an example, acid-labile diol chain extenders may have the formula:

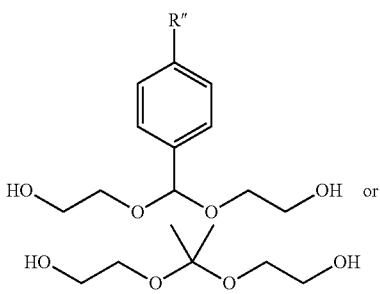

wherein R″ is OH, alkoxy, or polyether.

Suitable acid-labile prepolymers may be formed, e.g., by incorporating an acid-labile chain extender into the chain, such as by reaction of the acid-labile polyol chain extender with an isocyanate containing monomer or prepolymer. See, e.g., Scheme 2 below.

Photoacid generators. To form an acid with which to carry out an acid-mediated cleavage of the acid-labile groups, in some embodiments a suitable (ionic or non-ionic) photoacid generator (PAG) is included in the polymerizable liquid composition. PAGs are known in the field of photolithography and can be activated by a particular spectrum of light wavelengths. These materials typically generate strong acids upon exposure to light of appropriate wavelengths.

Examples of PAGs include, but are not limited to, onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 8,685,616; 7,824,839; 7,550,246; 7,534,844; 6,692,891; 5,374,500; and 5,017,461; see also *Photoacid Generator Selection Guide for the electronics industry and energy curable coatings* (BASF 2010).

Further examples of PAGs include, but are not limited to, arylketosulphinates, o-nitrobenzyl esters, naphthoquinonediazides, oximinosulphonates, trichloroacetophenones, trichloromethyl-S-triazines, etc.

In some embodiments, a polymerizable liquid composition as taught herein comprises from 0.5, 1, 2 or 5 percent by weight to 20, 30, 40, 90 or 99 percent by weight of the photopolymerizable monomers and/or prepolymers; from 0.5, 1, 2 or 5 percent by weight to 10, 20, 30, 40, 50 or 60 percent by weight of the chain extender; and from 0.01, 0.05, 0.1, 0.5 or 1 percent by weight to 5, 8 or 10 percent by weight of the free radical photoinitiator. In some embodiments, the polymerizable liquid composition comprises from 0.01, 0.05, 0.1, 0.5 or 1 percent by weight to 5, 8 or 10 percent by weight of the PAG, and may optionally include one or more additional components or ingredients.

Additional resin ingredients. The liquid resin can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can comprise an active agent or detectable compound as described below, though these may also be provided dissolved solubilized in the liquid resin. For example, magnetic or paramagnetic particles or nanoparticles can be employed.

Additional resin ingredients may also include pigments, dyes, active compounds or pharmaceutical compounds, detectable compounds (e. g., fluorescent, phosphorescent, radioactive), etc., again depending upon the particular purpose of the product being fabricated. Examples may also include proteins, peptides, nucleic acids (DNA, RNA) such as siRNA, sugars, small organic compounds (drugs and drug-like compounds), cells, etc., including combinations thereof.

Inhibitors of polymerization. In some embodiments, 3D printing by Continuous Liquid Interface Production (CLIP) makes use of polymerization inhibitors, which may be in the form of a liquid or a gas. In some embodiments, gas inhibitors are preferred. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas.

In some embodiments, the acid-labile groups form polar (i.e., water soluble) or non-polar groups upon acid cleavage. This, in turn, may provide a solubility difference of the acid-catalyzed portions of the printed articles versus non-acid catalyzed portions.

In some embodiments of the invention, the polymerizable liquid comprises a first light polymerizable component that may be polymerized as an "intermediate," and then further reacted, polymerizing, or chain extended, in subsequent steps. A purpose of the intermediate is to impart the shape of the object being formed or to create a scaffold for the subsequent steps. In some embodiments, the intermediate may form a cross-linked polymer network or a solid homopolymer. Examples of suitable reactive end groups for use in monomer and/or prepolymer polymerization of the intermediate include, but are not limited to, acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers. Compounds/compositions used in the subsequent reaction may be present in the composition undergoing polymerization to form the intermediate so it is present during the exposure to actinide radiation, or it could be infused into the intermediate object made during the 3D printing process in a subsequent step. See also PCT/US2015/036902 to Carbon3D, Inc., filed Jun. 22, 2015.

Three dimensional objects made by the process are, in some embodiments, collapsible or compressible, that is, elastic (e.g., has a Young's modulus at room temperature of from about 0.001, 0.01 or 0.1 gigapascals to about 1, 2 or 4 gigapascals, and/or a tensile strength at maximum load at room temperature of about 0.01, 0.1, or 1 to about 50, 100, or 500 megapascals, and/or a percent elongation at break at room temperature of about 10, 20 50 or 100 percent to 1000, 2000, or 5000 percent, or more).

Without wishing to be bound to any underlying mechanism, in some embodiments as taught herein, during thermal cure, blocked isocyanate groups are deblocked and a diisocyanate prepolymer is re-formed and quickly reacts with polyol chain extenders or additional soft segment to form thermoplastic or thermoset polyurethane as follows:

Scheme 1.

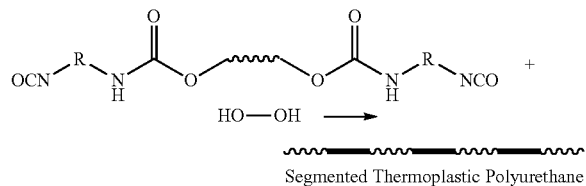

Segmented Thermoplastic Polyurethane

In Scheme 1 above, the dual-cure resin composition may comprise a UV-curable (meth)acrylate blocked polyurethane (ABPU), a reactive diluent, a photoinitiator, a PAG, and chain extender(s). The reactive diluent (10-50 wt %) could be an acrylate or methacrylate that helps to reduce the viscosity of the ABPU and will be copolymerized (hence reactive) with the ABPU under UV irradiation.

After UV curing to form a intermediate shaped product having polyurethane oligomers with blocked isocyanates as a scaffold, and carrying the chain extender, the ABPU resin is subjected to a thermal cure, during which a high molecular weight polyurethane is formed by a spontaneous reaction between the polyurethane oligomers and the chain extender(s). The polyurethane oligomer can react with chain extenders through substitution of TBAEMA, N-vinylformamide (NVF) or the like by chain extenders, such as by deblocking or displacement. The thermal cure time needed can vary depending on the temperature, size, shape, and density of the product, but is typically between 1 to 6 hours depending on the specific ABPU systems, chain extenders and temperature.

Reaction of the acid in the acidic region upon heating may occur concurrent or close in time to the three-dimensional object intermediate further reacting with chain extenders to form a three-dimensional object (e.g., an elastomeric object).

To produce an ABPU, TBAEMA may be used to block the isocyanate end groups of the oligomeric diisocyanate, which is derived from diisocyanate tipped polyols. The polyols used may be polyethers (e.g., polytetramethylene oxide (PTMO), polypropylene glycol (PPG), polyesters or polybutadiene). The molecular weight of these polyols can be 500 to 3000 Da, and 1000-2000 Da are currently preferred. In the presence of a catalyst (e.g., stannous octoate with 0.1-0.3 wt % to the weight of polyol; other tin catalysts or amine catalysts), diisocyanate (e.g., toluene diisocyanate (TDI), methylene diphenyl diisocyanate (MDI), hexamethylene diisocyanate (HDI), isophorone diisocyanate (IPDI), hydrogenated MDI (HMDI), etc.) is added to the polyol with certain molar ratio (2:1 molar ratio preferred) to block the end groups of the polyol (50-100° C.), resulting in an oligomer diisocyanate. TBAEMA is then added to the reaction (Note: moles(TBAEMA)*2+moles(polyol)*2=moles(isocyanate) *2) to generate ABPU (under 50-60° C.) Inhibitors such as hydroquinone (100-500 ppm) can be used to inhibit polymerization of methacrylate during the reaction.

In some embodiments, an acid-labile group may be incorporated into the ABPU, as shown in example Scheme 2 below. The methods may be carried out in accordance with procedures known in the art, and may be performed, e.g., without solvents at temperatures ranging from 40-100° C.

Figure 2A:
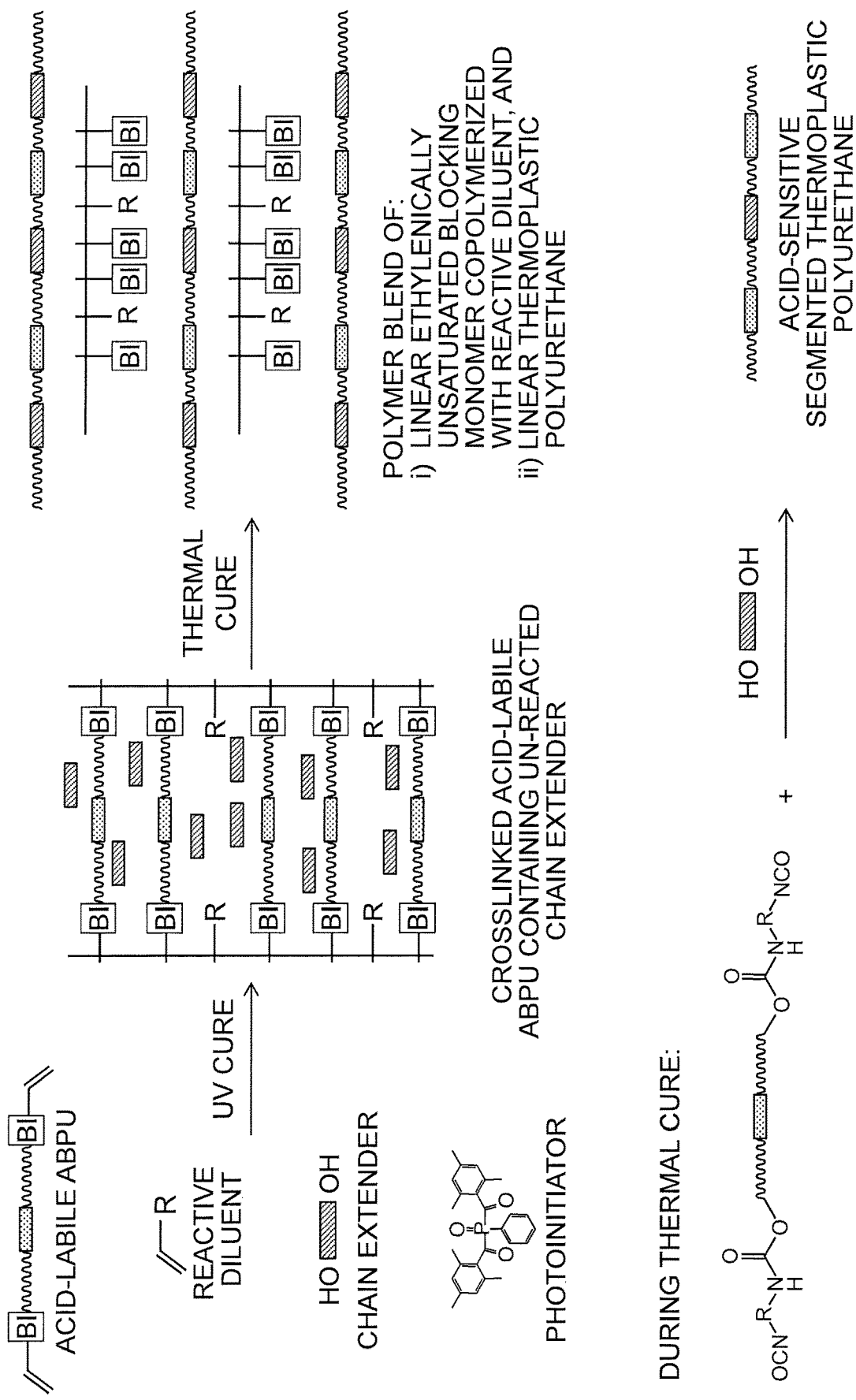
FIGS. 2A-2B present example schemes incorporating an acid-labile group into the (meth)acrylate blocked polyurethane (ABPU) (2A) or the chain extender (2B). During the thermal cure, blocked isocyanate is cleaved, and the diisocyanate prepolymer is re-formed and/or otherwise reacts with chain extenders to form thermoplastic polyurethane.
Figure 2B:
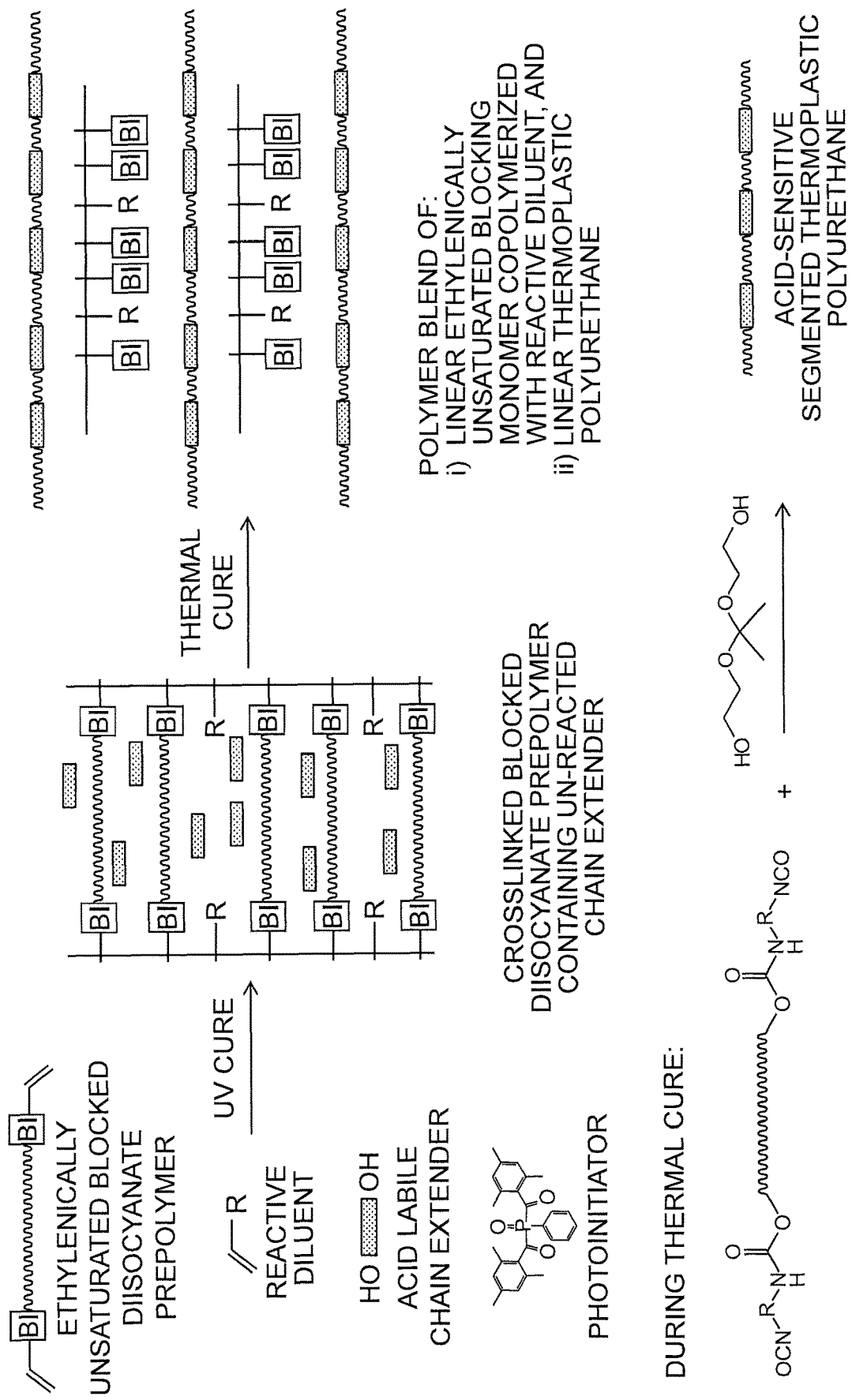

The acid-labile ABPU may be incorporated into the UV cure as illustrated in the example provided in FIG. 2A.

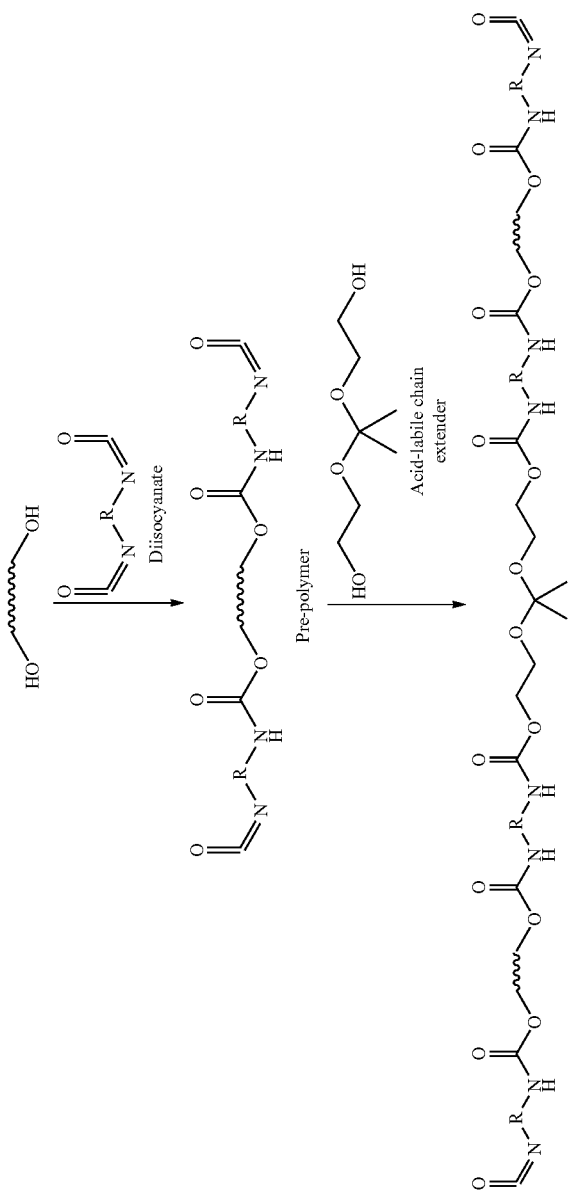
Scheme 2. Example synthesis of acid-labile ABPU

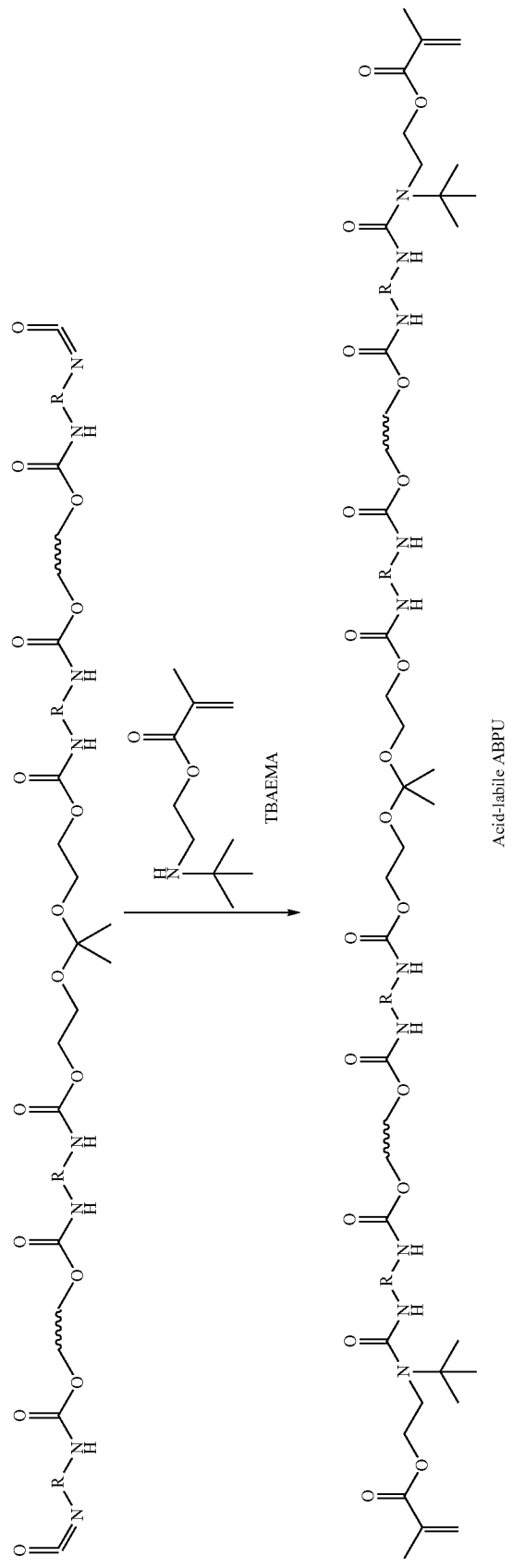
Scheme 2. Example synthesis of acid-labile ABPU (continued)

2. Methods.

Polymerizable liquid compositions comprising a photoacid generator as taught herein are useful in additive manufacturing to create an article or precursor thereof (intermediate article) having or intended to have portions of different solubility and/or melting temperature ($T_m$) or glass transition temperature ($T_g$). For example, the formed object may have a portion in which the photoacid generator is active, by irradiating this portion of the object upon manufacture with an appropriate wavelength to activate the photoacid generator, whereupon the photoacid generator produces acid. This portion in which the photoacid generator is activated and has produced acid may be referred to herein as an "acidic" region.

In some embodiments, upon heating the manufactured object, the acid of the acidic region will react with acid-labile groups in the polymerized object, resulting in breaks in the polymer's chemical structure that renders those regions more easily dissolved and/or melted. In some embodiments, reacted acid-labile groups form moieties that create a difference in solubility of the acidic region(s) as compared to the non-acidic region(s) of the object (e.g., in aqueous solution, organic solvent, etc.). In some embodiments, the acid-labile groups, upon cleaving, may regenerate or generate additional free protons (H+) that go onto to catalyze the further cleaving of other acid-labile groups in a chemical amplification.

This reaction of the acid in the acidic region upon heating may occur concurrent or close in time to the three-dimensional object intermediate further reacting with chain extenders to form a three-dimensional object (e.g., an elastomeric object).

In some embodiments, the portions of different solubility and/or melting temperature ($T_m$) or glass transition temperature ($T_g$) of the object are support structures or a portion thereof (e.g., the portion of the support structure that is directly connected to the rest of the object).

In some embodiments, the object is formed from a polymerizable liquid composition as described above by additive manufacturing, typically bottom-up or top-down additive manufacturing. Such methods are known and described in, for example, U.S. Pat. No. 5,236,637 to Hull, U.S. Pat. No. 7,438,846 to John, U.S. Pat. No. 8,110,135 to El-Siblani, and U.S. Patent Application Publication Nos. 2013/0292862 to Joyce and 2013/0295212 to Chen et al. The disclosures of these patents and applications are incorporated by reference herein to the extent consistent with the descriptions herein.

In general, bottom-up three-dimensional (3D) fabrication may be carried out by:

(a) providing a carrier and an optically transparent member having a build surface, said carrier and said build surface defining a build region therebetween;

(b) filling said build region with a polymerizable liquid;

(c) polymerizing said polymerizable liquid composition to form a solid polymer, wherein said polymerizing is carried out by irradiating said build region through said build plate with light to activate a free radical photoinitiator and polymerize the photopolymerizable monomer to form a polymer, thereby forming a solid polymer in said build region; and (d) advancing said carrier with said solid polymer adhered thereto away from said build surface on said build plate to create a subsequent build region between said solid polymer and said build surface.

In some embodiments, the article is formed by continuous liquid interface production (CLIP). CLIP is known and described in, for example, PCT Application Nos. PCT/US2014/015486 (also published as US 2015/0102532); PCT/US2014/015506 (also published as US 2015/0097315), PCT/US2014/015497 (also published as US 2015/0097316), and in J. Tumbleston, D. Shirvanyants, N. Ermoshkin et al., Continuous liquid interface production of 3D Objects, *Science* 347, 1349-1352 (published online 16 Mar. 2015). In some embodiments, CLIP employs features of a bottom-up three dimensional fabrication as described above, but the irradiating and/or said advancing steps are carried out while also concurrently: (i) continuously maintaining a dead zone of polymerizable liquid in contact with said build surface, and (ii) continuously maintaining a gradient of polymerization zone (such as an active surface) between said dead zone and said solid polymer and in contact with each thereof, said gradient of polymerization zone comprising said first component in partially cured form. In some embodiments of CLIP, the optically transparent member comprises a semipermeable member (e.g., a fluoropolymer), and said continuously maintaining a dead zone is carried out by feeding an inhibitor of polymerization through said optically transparent member, thereby creating a gradient of inhibitor in said dead zone and optionally in at least a portion of said gradient of polymerization zone.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or the gradient of polymerization zone and the dead zone together have a thickness of from 1 or 2 microns up to 400, 600, or 1000 microns, or more. Thus, the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

The method may further comprise the step of disrupting the gradient of polymerization zone for a time sufficient to form a cleavage line in the three-dimensional object (e.g., at a predetermined desired location for intentional cleavage, or at a location in the object where prevention of cleavage or reduction of cleavage is non-critical), and then reinstating the gradient of polymerization zone (e.g., by pausing, and resuming, the advancing step, increasing, then decreasing, the intensity of irradiation, and combinations thereof).

CLIP may be carried out in different operating modes (that is, different manners of advancing the carrier and build surface away from one another), including continuous, intermittent, reciprocal, and combinations thereof.

Thus, in some embodiments, the advancing step is carried out continuously, at a uniform or variable rate, with either constant or intermittent illumination or exposure of the build area to the light source.

In other embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.), etc.

In some embodiments, the rate of advance (whether carried out sequentially or continuously) is from about 0.1 1, or 10 microns per second, up to about to 100, 1,000, or 10,000 microns per second, again depending on factors such as temperature, pressure, structure of the article being produced, intensity of radiation, etc.

In still other embodiments, the carrier is vertically reciprocated with respect to the build surface to enhance or speed the refilling of the build region with the polymerizable liquid. In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the z-plane) in part or in whole.

In some embodiments, the methods comprise polymerizing a build region of said polymerizable liquid composition to form a crosslinked polymer (e.g., a crosslinked polymer intermediate), wherein said polymerizing is carried out by irradiating said polymerizable liquid with light having a first wavelength or intensity; and activating a photoacid generator by further irradiating a portion of the build region intended to be acidic with light having a second wavelength or intensity, whereby the photoacid generator produces acid in said portion of the crosslinked polymer to thereby form an acidic region.

The first wavelength or intensity may be one in which the photopolymerization of the monomers and/or prepolymers and crosslinkers by the photoinitiator are active, but in which the photoacid generator is not activate. The second wavelength or intensity may be one in which the photoacid generator is activated (which may or may not also be a wavelength in which the photopolymerization is active). In this manner, only a portion of the polymerized object will have an active photoacid generator.

FIGS. 1A-1G provide example graphs of a photoinitiator (PI) and photoacid generator (PAG) which are activated by light at different ranges of wavelengths or intensities. To illustrate activation, an example first light source X and second light source Y are provided, each having an emission spectrum represented by three vertical lines, the middle line representing the wavelength at maximum intensity, and the flanking lines representing the full width at half maximum intensity (FWHM).

Figure 1A:
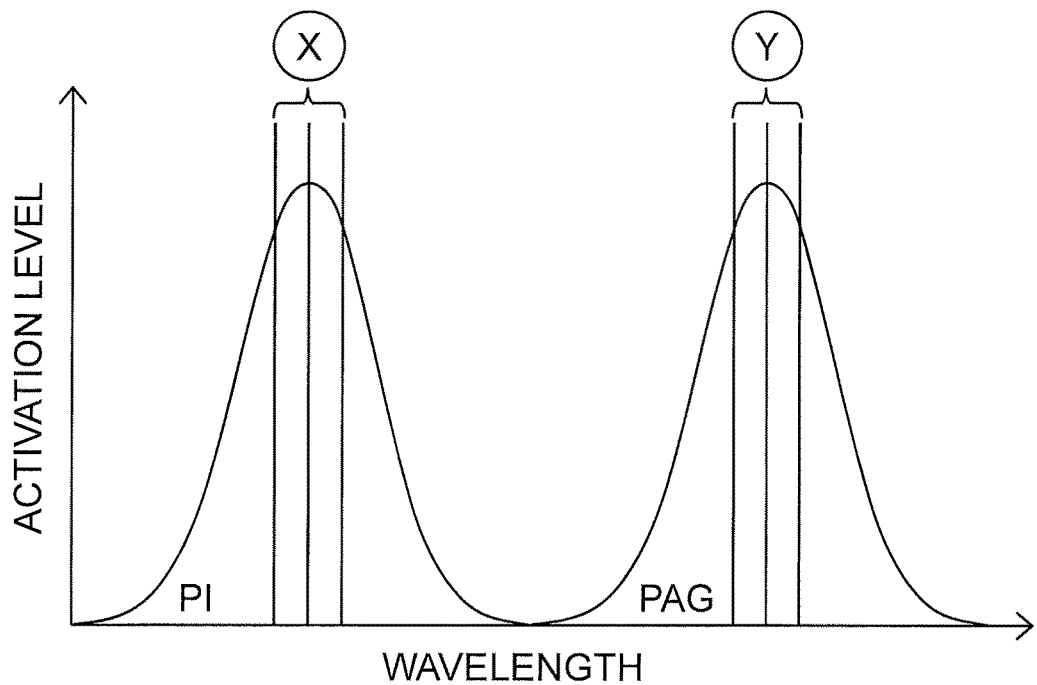
FIGS. 1A-1G provide example graphs of a photoinitiator (PI) and photoacid generator (PAG) which are activated by light at different ranges of wavelengths or intensities. An example first light source X and second light source Y are provided, each having an emission spectrum represented by three vertical lines, the middle line representing the wavelength at maximum intensity, and the flanking lines representing the full width at half maximum intensity (FWHM).

In FIG. 1A, the PI and PAG have non-overlapping activation (absorbance) ranges. To activate the PI but not PAG (or not appreciably), only light source X is applied. To activate both PI and PAG, both light source X and light source Y are applied. For example, light source X may be applied in the entire area of polymerization, while Y is applied only in the region intended to have PAG activation (e.g., with a focused projector).

Figure 1B:
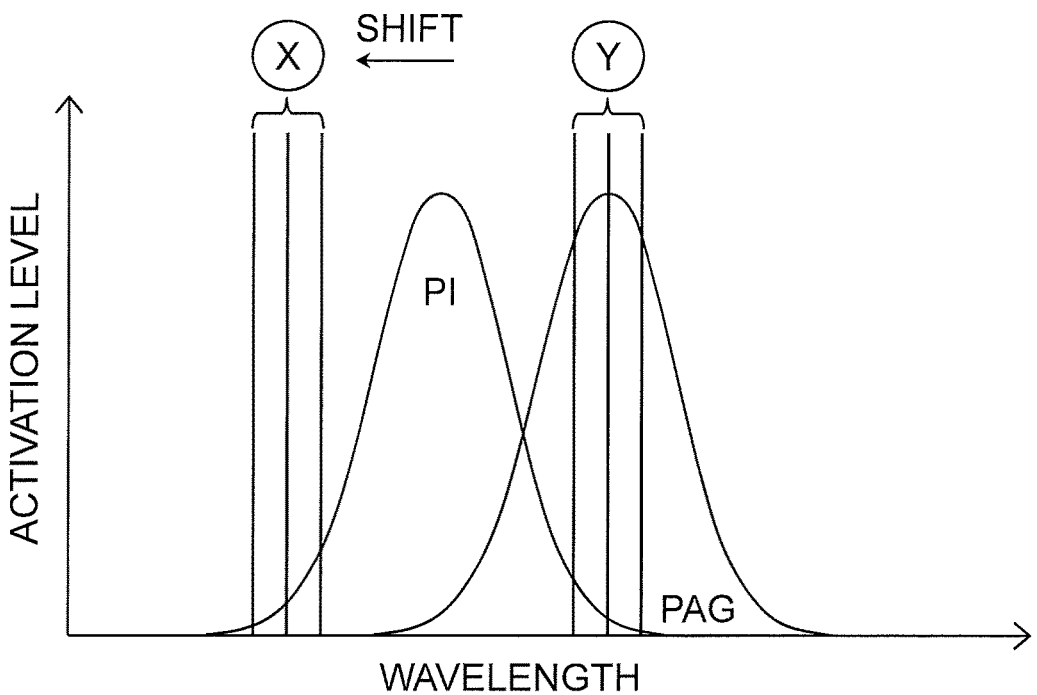

FIG. 1B provides an example graph of PI and PAG having overlapping activation ranges. In this instance, the X light source used is shifted down in wavelength range in order to have X activate PI but not PAG (or not appreciably). To activate both PI and PAG, both light source X and light source Y are applied. Light source Y is at the peak of activation for the PAG but also overlaps the PI activation. This is acceptable since the PI is also activated in the PAG-active region. To activate the PI but not PAG (or not appreciably), only light source X is applied.

Figure 1C:
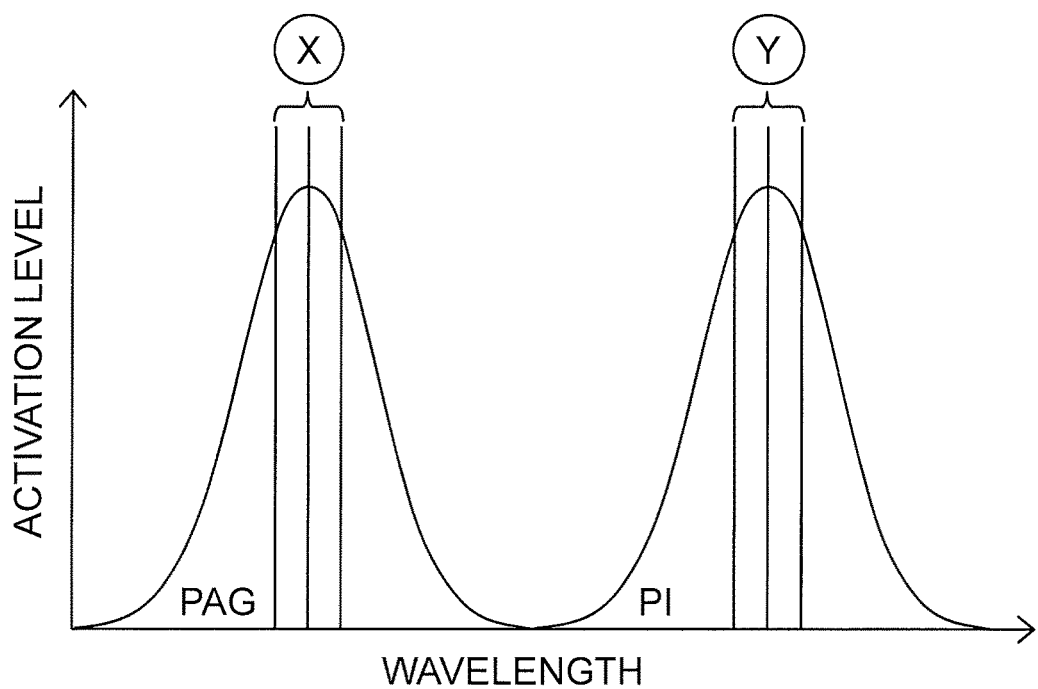

In FIG. 1C, the PI and PAG have non-overlapping activation (absorbance) ranges, with the activation range of PAG is at a lower range of wavelengths than the activation range of PI. To activate the PI but not PAG (or not appreciably), only light source Y is applied. To activate both PI and PAG, both light source X and light source Y are applied.

Figure 1D:
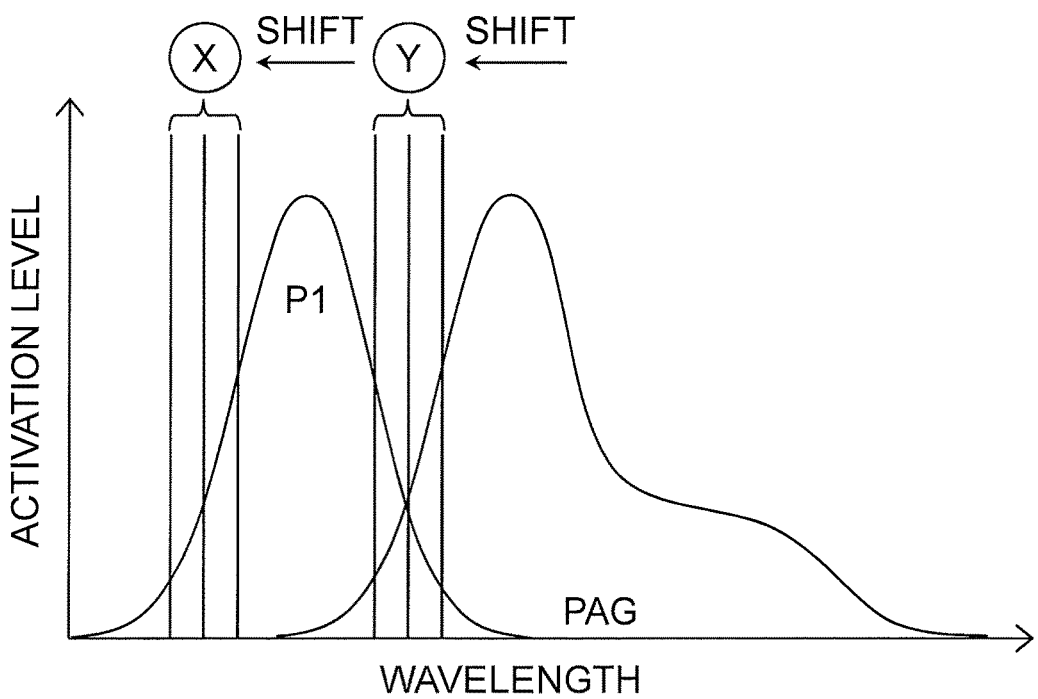

FIG. 1D provides another example graph of PI and PAG having overlapping activation ranges. In this instance, the X light source used is shifted down in wavelength range in order to have X activate PI but not PAG (or not appreciably). Light source Y is also shifted to lower wavelengths to be able to activate both PI and PAG without the need to also apply light source X in the PAG-active region.

Figure 1E:
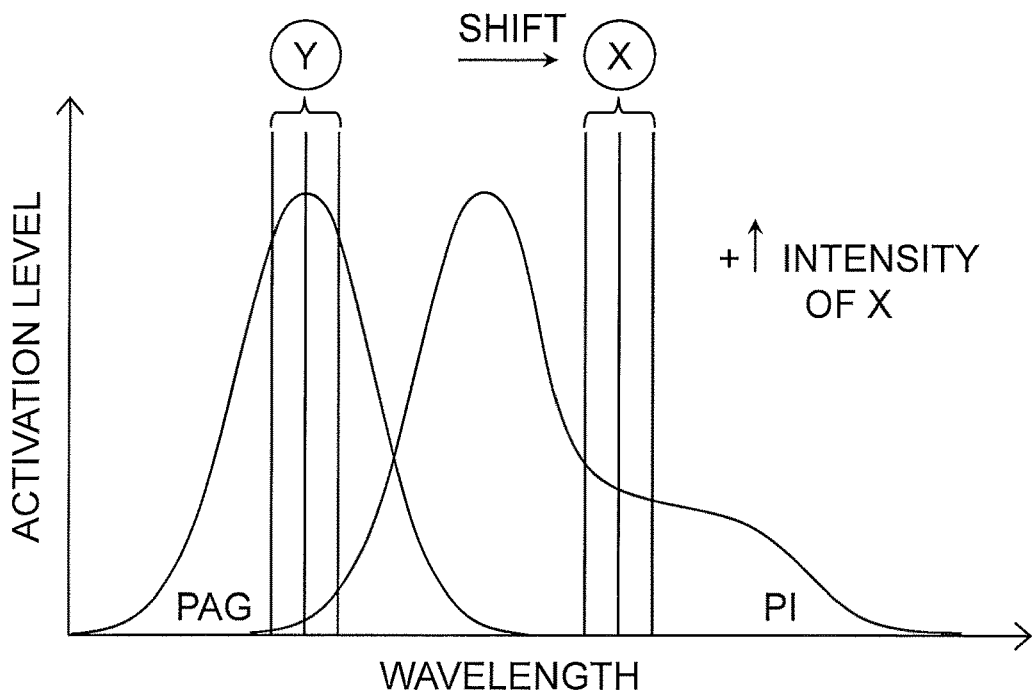

In FIG. 1E, the PI and PAG have overlapping activation ranges, with the PI having a tail in the higher wavelengths. In this instance, the X light source used is shifted up in wavelength in order to have X activate PI but not PAG (or not appreciably), and shifted up in intensity to account for the lower absorbance of the PI at the lower wavelengths. Light source Y is not shifted in this example, but it could be also shifted up, if desired, similar to FIG. 1D to be able to activate both PI and PAG without the need to also apply light source X in the PAG-active region.

Figure 1F:
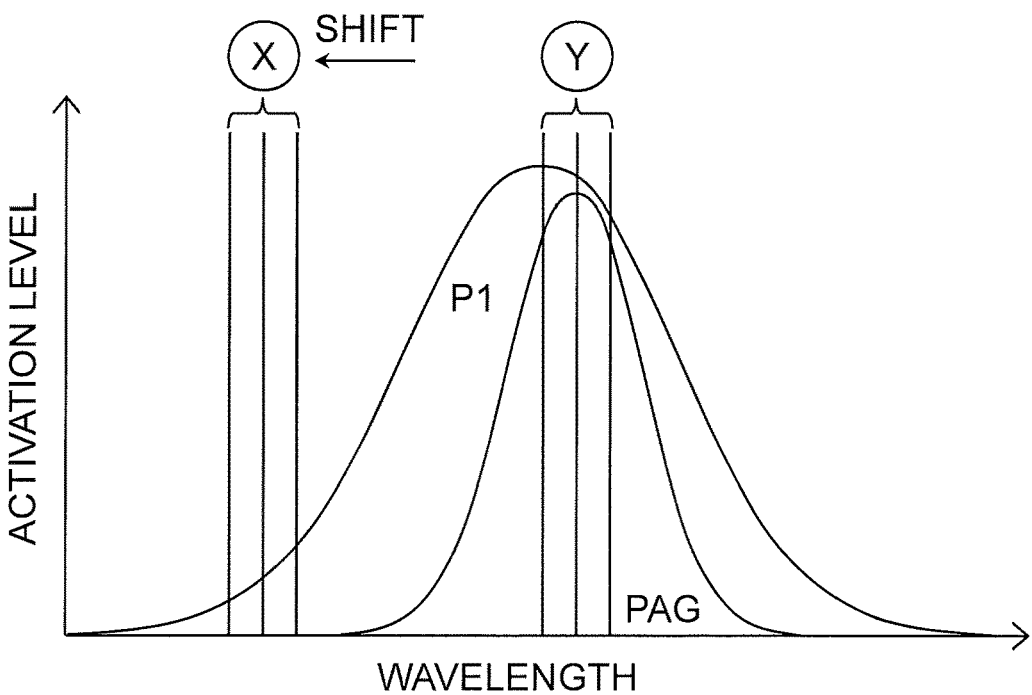

FIG. 1F shows an example graph in which the activation range of the PAG is wholly within the activation range of the PI. The X light source used is shifted down in wavelength in order to have X activate PI but not PAG (or not appreciably). Light source Y can activate both PI and PAG without the need to shift from the PAG activation peak.

Figure 1G:
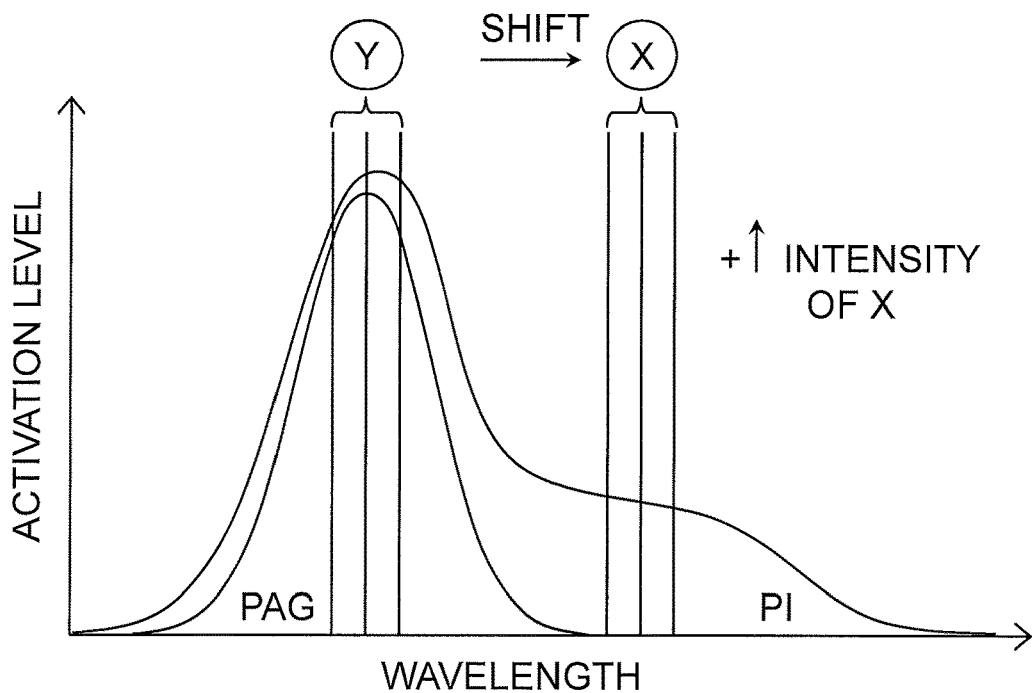

FIG. 1G shows another example graph in which the activation wavelength range of the PAG is wholly within the activation wavelength range of the PI. The X light source used is shifted up in wavelength in order to have X activate PI but not PAG (or not appreciably), and can be increased in intensity to account for the lower absorbance of the PI at the higher wavelengths. Light source Y can activate both PI and PAG without the need to shift from the PAG activation peak.

Figure 1H:
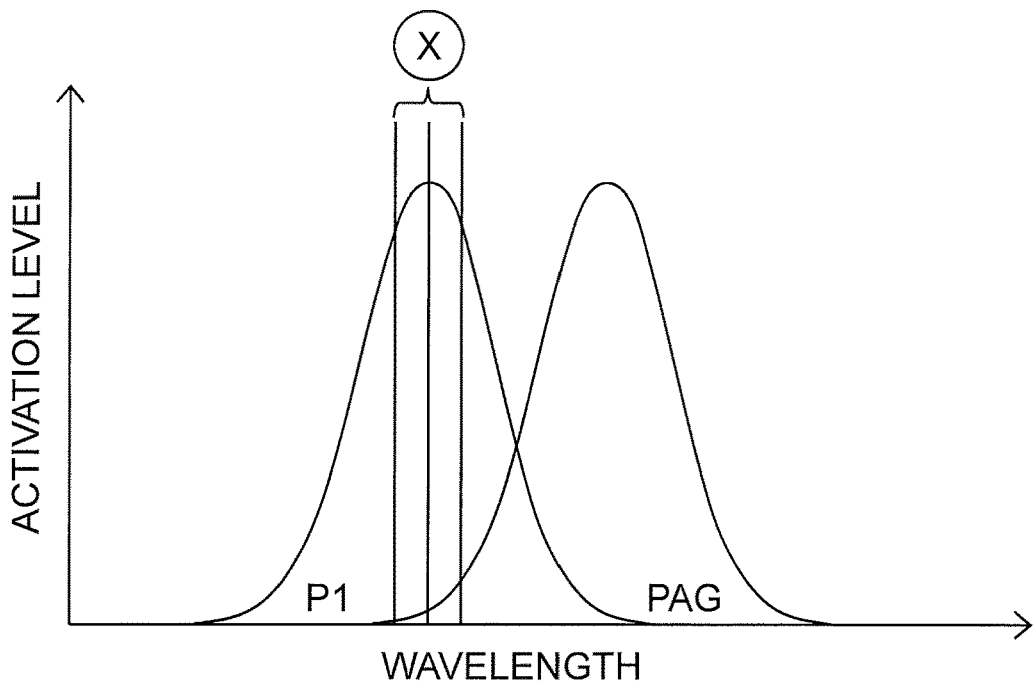
FIG. 1H shows an example graph in which the PI and PAG have overlapping activation ranges, and the X light source used is centered at the peak activation of the PI.

In FIG. 1H, the PI and PAG have overlapping activation ranges, and the X light source used is centered at the peak activation of the PI. Thus, at a lower intensity, PI is activated but PAG is not appreciably activated. However, upon increasing the intensity of X, both PI and PAG are activated.

In some embodiments, light of both the first and second wavelengths or intensities is applied to the PAG-activated portion of the object being polymerized. Light of the first wavelength or intensity may be applied to the PAG-activated portion of the object concurrently, prior to or after the light of the second wavelength or intensity. In some embodiments, the second wavelength or intensity is sufficient to activate the photopolymerization as well as the PAG, and thus only the second wavelength or intensity need be applied to the PAG-activated portion of the object to activate both the photoinitiator (PI) and the PAG.

In some embodiments, light of the first wavelength or intensity is produced by a first light source, and light of the second wavelength or intensity is produced by (or added to the first light source by) a second light source. The first light source may illuminate the PAG-activated portion of the object concurrently, prior to or after the second light source.

In some embodiments, the first wavelength is applied at the same depth in the resin as the second wavelength. In some embodiments, the first wavelength is applied at different depth(s) than the second wavelength.

Once the three-dimensional object is formed, it may be removed from the carrier, optionally washed, and then heated and/or microwave irradiated sufficiently to further cure the resin and/or react the acid-labile groups of the acidic region.

In some embodiments, the heating step is carried out at a temperature greater than ambient temperature. For example, the object may be heated to a temperature of about 40° C. to about 250° C., or a temperature of about 50 or 60° C., to 70, 80, 90, 100, 110, 120, 130, 140, 150, 175, 200, 225, or 250° C. with the duration of each heating depending on the size, shape, and/or thickness of the object or portion thereof being heated.

In alternative embodiments, the formed object is not heated, but left at room temperature (e.g., 25 degrees Celsius) for a sufficient amount of time to allow the crosslinked polymer of the three-dimensional object intermediate to react with the chain extenders to form a three-dimensional object, and/or acid of the acidic region to reacts with the acid-labile groups to form reacted groups.

In some embodiments, upon heating the three-dimensional object, acid of the acidic region reacts with the acid-labile groups to form reacted groups. In some embodiments, the reacted groups comprise polar or non-polar moieties conferring a difference in solubility as compared to a non-acidic region of the three-dimensional object.

FIGS. 4A-4B present a schematic of additive manufacturing of an article (10) having a PAG-active acidic region (FIG. 4A), with subsequent dissolving of the PAG-active regions (FIG. 4B).

In some embodiments, after baking, the three-dimensional object with portions of differing solubility is then exposed to an aqueous or non-aqueous solution suitable for dissolving the portion having the acid-reacted groups. In some embodiments, the baking and exposure to the solution may be conveniently combined into a concurrent step (e.g., baking the three-dimensional object while submerged in the solution).

3. Products.

The resins and methods described above are particularly useful for making three-dimensional articles with rafts and/or that have overhangs or otherwise are in need of support(s) during the fabrication process, and/or desired to have portions of differing solubility/melting temperatures to allow selective ablation/dissolving/melting. Products that may be produced by the methods and resins described herein include, but are not limited to, large-scale models or prototypes, small custom products, miniature or microminiature products or devices, etc. Examples include, but are not limited to, mechanical parts, medical devices and implantable medical devices such as stents, drug delivery depots, functional structures, microneedle arrays, fibers and rods such as waveguides, micromechanical devices, microfluidic devices, etc.

Further examples of products that may be produced by the methods and resins described herein include, but are not limited to, medical devices and implantable medical devices such as stents, drug delivery depots, catheters, bladder, breast implants, testicle implants, pectoral implants, eye implants, contact lenses, dental aligners, microfluidics, seals, shrouds, and other applications requiring high biocompatibility, functional structures, microneedle arrays, fibers, rods, waveguides, micromechanical devices, microfluidic devices; fasteners; electronic device housings; gears, propellers, and impellers; wheels, mechanical device housings; tools; structural elements; hinges including living hinges; boat and watercraft hulls and decks; wheels; bottles, jars and other containers; pipes, liquid tubes and connectors; foot-ware soles, heels, innersoles and midsoles; bushings, o-rings and gaskets; shock absorbers, funnel/hose assembly, cushions; electronic device housings; shin guards, athletic cups, knee pads, elbow pads, foam liners, padding or inserts, helmets, helmet straps, head gear, shoe cleats, gloves, other wearable or athletic equipment, brushes, combs, rings, jewelry, buttons, snaps, fasteners, watch bands or watch housings, mobile phone or tablet casings or housings, computer keyboards or keyboard buttons or components, remote control buttons or components, auto dashboard components, buttons, dials, auto body parts, paneling, other automotive, aircraft or boat parts, cookware, bakeware, kitchen utensils, steamers and any number of other 3D objects.

A "raft," as known in the art, is an extra layer or portion, often wider than the article being fabricated, connected to the carrier that serves to increase the adhesion of the manufactured article to the carrier.

Supports useful in fabricating an article with fine/delicate structures, rounded or cantilevered sections and overhangs are known, and include, but are not limited to, pillars, lattices or blocks situated thereunder and intended to be removed after fabrication. For example, FIG. 3 is a photograph of an example additive manufacturing product (10), a ball, which has a rounded surface that is manufactured with supports (12) and on a raft (13). The supports are removed after fabrication.

FIG. 5 shows a schematic of an example article having PAG-active acidic regions at the point of contact of the supports (12) with the printed object (10). As taught herein, the supports can be removed by dissolving the PAG-active regions.

FIG. 6 shows a schematic of an example article (10) having a "brick" of cured material where a shape is defined by the regions of inactive PAG and active PAG. Regions of active PAG in the support structure (12) can be dissolved after thermal cure to produce the shaped article.

In some embodiments, the acidic regions comprise less than 20, 30, 40 or 50% of the total volume of the manufactured article. In some embodiments, the acidic and non-acidic regions are integrally formed with one another during fabrication. In some embodiments, the article is unitary (that is, formed of a single polymerizable liquid); in some embodiments, the article is a composite (that is, formed of two or more different polymerizable liquids). In some embodiments, the article is a unitary member, meaning it is seamless and/or is not formed by the joining of two or more component pieces.

In some embodiments, a portion of the article is solubilized/melted in order to free a caged or trapped internal element (e.g., gear, impeller, valve, gate, piston, etc. in a housing; ball in a ball, etc.). In some embodiments, the internal element is rigidly connected to the housing in a pre-aligned manner for ease of post-fabrication assembly or operation, e.g., pre-aligned for insertion of a shaft therethrough in the housing, followed by solubilization/melting of the rigid support.

4. Apparatus for Additive Manufacturing.

Various types of apparatuses are known in the art of additive manufacturing that make use of a light source to effect polymerization. In some embodiments, the apparatus includes one, two, or three or more light sources such as lamps capable of transmitting one or more wavelengths of light in the UV, near-visible or visible spectrum. In some embodiments, the light may be filtered to alter the output spectrum, if desired.

In some embodiments, the apparatus may comprise a controller configured to control transmission of the first and/or second wavelengths and/or intensities of light as appropriate to create PAG-active and PAG-inactive regions of the formed polymeric object. In some embodiments, PAG-active and PAG-inactive regions may occur in the same frame or slice, or same layer, of the object in the z-plane.

In some embodiments, the lamp may emit wavelengths in the i-line region (e.g., 365 nm). In some embodiments, the lamp may emit wavelengths in the h-line region (e.g., 405 nm). In some embodiments, the lamp may emit wavelengths in the g-line region (e.g., 436 nm).

In some embodiments, the lamp may comprise a light emitting diode (LED). LED lamps may emit at discrete peak wavelengths throughout the UV spectrum, such as at 436 nm, 405 nm, 395 nm, 390 nm or 365 nm. See also U.S. Patent Application Publication 2012/0251841 to Southwell et al. In some embodiments, the lamp may be an LED UV lamp having a peak wavelength at 365 nm, 385 nm, or 405 nm (e.g., Nichia Corporation UV LED, U365, U385, U405, Cat. No. 140826).

In some embodiments, the peak wavelength has a spectrum half width (i.e., full width at half maximum intensity (FWHM)) of from 2 or 5 to 8, 9, 10, 11, 12 or 15 nm.

In some embodiments, the lamp may comprise a laser. For example, the laser may be a helium-cadmium (325 nm), nitrogen (337 nm), krypton (337 nm), argon ion (363 nm, 488 nm and 514 nm), neodymium-YAG (532 nm), or helium-neon (633 nm) laser.

In some embodiments, the light source may comprise a tunable UV light system, such as that in U.S. Pat. No. 3,947,688 to Massey; U.S. Pat. No. 5,745,284 to Goldberg et al.; U.S. Pat. No. 6,876,689 to Walling et al.; U.S. Pat. No. 7,848,381 to Barnes et al.; or U.S. 2002/0054613 to Jin Kang.

In some embodiments, the lamp may comprise a mercury lamp such as a medium-pressure mercury (MPM) lamp ("H" lamp), which typically emits UV wavelengths of about 254 nm, about 313 nm, about 365 nm (i-line), about 405 nm (h-line), and about 436 nm (g-line).

In some embodiments, the lamp may be an arc lamp such as a mercury arc lamp, xenon arc lamp or mercury-xenon arc lamp.

In some embodiments, the lamp may comprise an electrodeless UV lamp. See U.S. Pat. No. 4,501,993 to Mueller et al.

In some embodiments, the lamp may comprise a doped lamp, such as with iron, lead, tin and/or gallium, such as a D lamp (doped with iron) or V lamp (doped with gallium).

In some embodiments, the lamp may comprise a low-pressure mercury lamp, which typically emits short wavelength UV such as about 254 nm.

In some embodiments, the lamp may comprise an excimer lamp, which typically emits short wavelength UV such as about 308 nm.

Embodiments of the present invention are explained in greater detail in the following non-limiting examples.

EXAMPLES

With reference to FIG. 4A, "PAG active" and "PAG inactive" regions can be generated in the same plane of fabrication' by exposing the X wavelength for PAG inactive (insoluble) regions, and exposing the X+Y wavelengths for PAG active (soluble) regions, before advancing the part to the next planar frame. After printing, a post-exposure baking step is performed, followed by washing/soaking in an appropriate solvent until the supports are removed. See FIG. 4B.

In some embodiments, only connection points of supports to the part receive the exposure of both X&Y wavelengths (i.e., are PAG active). See FIG. 5. In this embodiment, it is not necessary to dissolve the entire support for removal.

With reference to FIG. 6, in some embodiments, one could fabricate a "brick" of cured material where all regions are exposed and the part is defined by the regions of X vs. X+Y exposure. Similarly, this soluble structure could be a lattice or other patterned region.

Example 1

Acid-labile Abpu with Non-acid Labile Chain Extender

A composition containing the following is prepared:

10-50 wt % of the acid-sensitive acrylate-blocked polyurethane shown below:

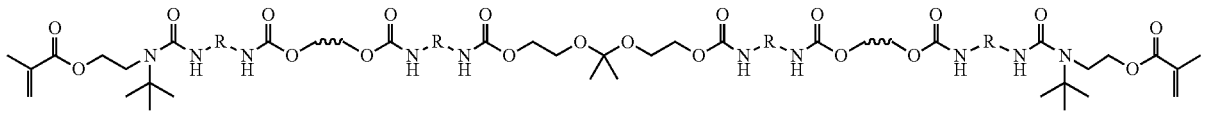

10-80 wt % of the reactive diluent shown below (isobornyl acrylate):

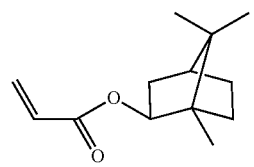

5-20% of the diol chain-extender show below (1,4 butanediol):

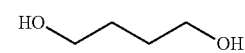

1 wt % of the free radical photoinitiator below (Irgacure 819). Active with 365-405 nm LEDs

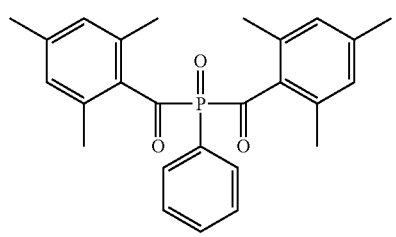

1-4 wt % of the photoacid generator shown below (Irgacure 290 TPC). Active with 365 nm LED but not with 405 nm LED.

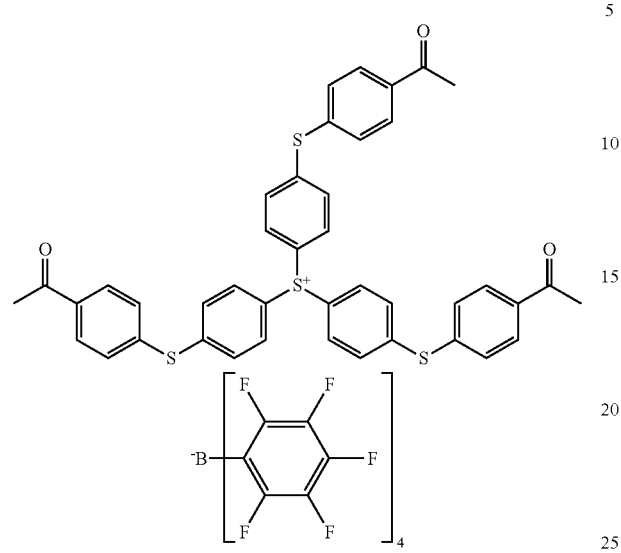

The above formulation is mixed and placed into a printer equipped with a dual-LED system having a 365 nm and 405 nm LED. When only the 365 nm light is on, or when both the 365 nm and 405 nm LEDs are on, both the PAG and the free radical initiator will be active, thus forming cross-linked material containing acid ("acidic region"). When only the 405 nm light is on, the PAG will remain inactive, but the free radical initiator will be active, thus forming a cross-linked material without the PAG-generated acid.

The part is printed, residual resin is washed away using a suitable solvent (e.g., isopropanol), the part is dried and put into an oven set at 120° C. During the heating step, the chain extender reacts with the ABPU to form higher molecular weight polyurethane. Additionally, the acid degrades the acid-labile groups in the acidic regions that had been exposed to 365 nm light, thus forming soluble polymer chains. The material in the regions exposed to only 405 nm light remains intact, and, therefore, that region remains insoluble. The part is removed from the oven and placed in an isopropanol or aqueous bath. The soluble portions of the part are dissolved away, leaving only the insoluble portions of the part.

Example 2

Standard ABPU with Acid-labile Chain Extender

A composition containing the following is prepared:
10-50 wt % of the acid-sensitive acrylate-blocked polyurethane shown below:

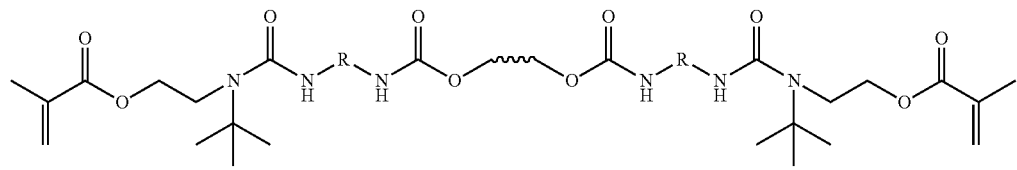

10-80 wt % of the reactive diluent shown below (isobornyl acrylate):

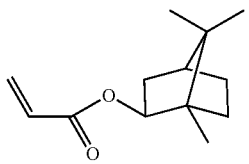

5-20% of the acid-sensitive diol chain-extender shown below:

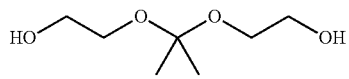

1 wt % of the free radical photoinitiator below (Irgacure 819). Active with 365-405 nm LEDs

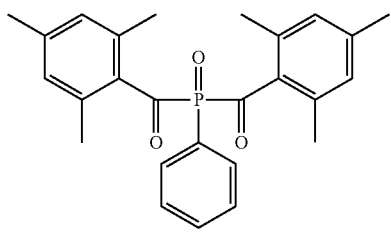

1-4 wt % of the photoacid generator shown below (Irgacure 290 TPC). Active with 365 nm LED but not with 405 nm LED.

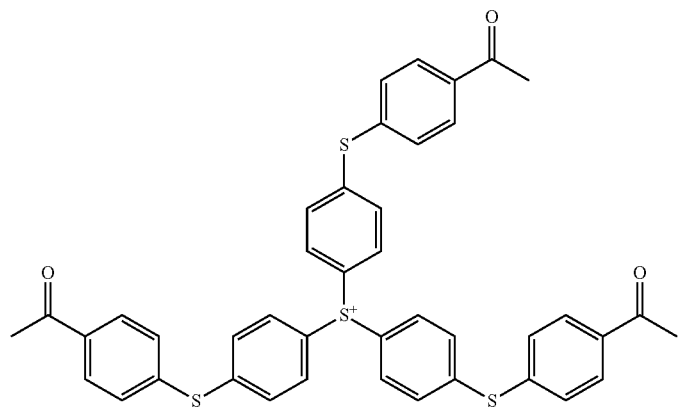 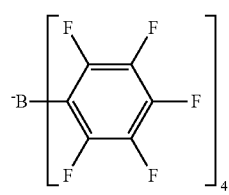

The above formulation is mixed and placed into a printer equipped with a dual-LED system having a 365 nm and 405 nm LED. When only the 365 nm light is on, or when both the 365 nm and 405 nm LEDs are on, both the PAG and the free radical initiator will be active, thus forming cross-linked material containing acid ("acidic region"). When only the 405 nm light is on, the PAG will remain inactive, but the free radical initiator will be active, thus forming a cross-linked material without the PAG-generated acid.

The part is printed, residual resin is washed away using a suitable solvent (e.g., isopropanol), the part is dried and put into an oven set at 120° C. During the heating step, the chain extender reacts with the ABPU to form higher molecular weight polyurethane. Additionally, the acid degrades the acid-labile groups in the acidic regions that had been exposed to 365 nm light, thus forming soluble polymer chains. The material in the regions exposed to only 405 nm light remains intact, and, therefore, that region remains insoluble. The part is removed from the oven and placed in an isopropanol or aqueous bath. The soluble portions of the part are dissolved away, leaving only the insoluble portions of the part.

Example 3

Acid-labile ABPU with Acid-labile Chain Extender

A composition containing the following is prepared:
10-50 wt % of the acid-sensitive acrylate-blocked polyurethane shown below:

10-80 wt % of the reactive diluent shown below (isobornyl acrylate):

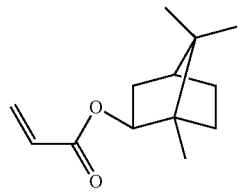

5-20% of the diol chain-extender shown below (PACM):

1 wt % of the free radical photoinitiator below (Irgacure 819). Active with 365-405 nm LEDs

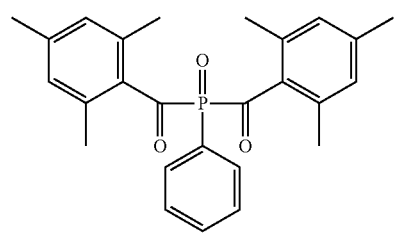

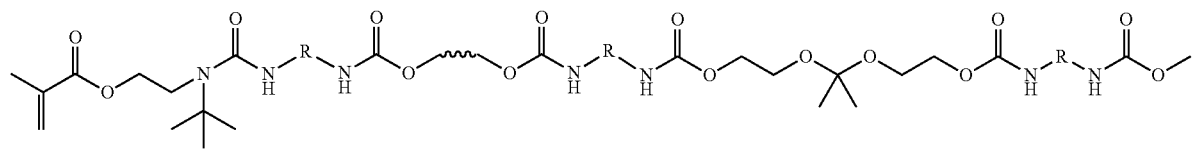

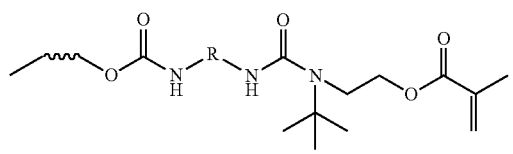

1-4 wt % of the photoacid generator shown below (Irgacure 290 TPC). Active with 365 nm LED but not with 405 nm LED.

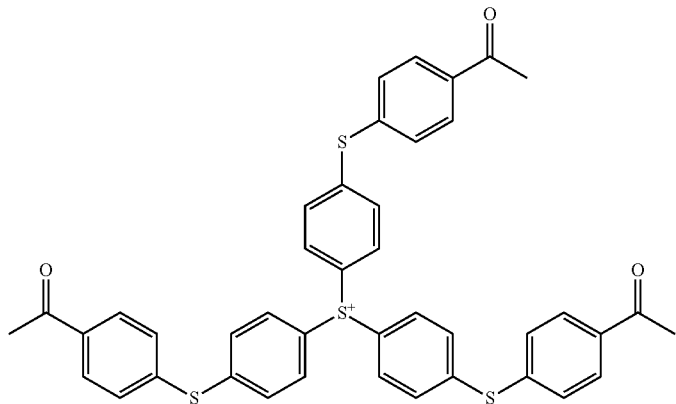
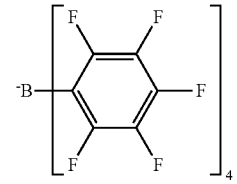

The above formulation is mixed and placed into a printer equipped with a dual-LED system having a 365 nm and 405 nm LED. When only the 365 nm light is on, or when both the 365 nm and 405 nm LEDs are on, both the PAG and the free radical initiator will be active, thus forming cross-linked material containing acid ("acidic region"). When only the 405 nm light is on, the PAG will remain inactive, but the free radical initiator will be active, thus forming a cross-linked material without the PAG-generated acid.

The part is printed, residual resin is washed away using a suitable solvent (e.g., isopropanol), the part is dried and put into an oven set at 120° C. During the heating step, the chain extender reacts with the ABPU to form higher molecular weight polyurethane. Additionally, the acid degrades the acid-labile groups in the acidic regions that had been exposed to 365 nm light, thus forming soluble polymer chains. The material in the regions exposed to only 405 nm light remains intact, and, therefore, that region remains insoluble. The part is removed from the oven and placed in an isopropanol or aqueous bath. The soluble portions of the part are dissolved away, leaving only the insoluble portions of the part.

Example 4

Above Examples with Acid-cleavable Monomer for Solubility Switch

Above examples, but replacing some of the reactive diluent with the monomer below:

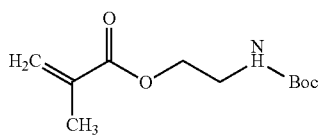

This monomer cleaves to form a free amine and adds a further solubility shift to the materials.

Example 5

Above Examples with Acid-cleavable Crosslinker Replacing Some of the Reactive Diluent Above examples, but replacing some of the reactive diluent with the acid-cleavable monomer below:

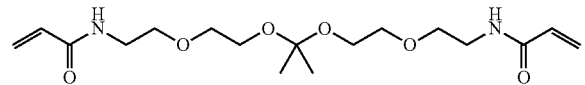 [SMILES: C=CC(=O)NCCOCCOC(C)(C)OCCOCCNC(=O)C=C]

Dissolution Study with Homopolymers

Homopolymers of the following monomers were prepared by bulk UV polymerization initiated by Phenylbis(2,4,6-trimethylbenzoyl)phosphine oxide (PPO) and cured into homopolymer films:

2-carboxylethyl acrylate (CEA)

2-hydroxylethyl methacrylate succinate (HEMAS)

Films were submersed into NaOH solution (0.5 N), and their dissolution rates were measured by thickness reduction.

Dissolution rate for CEA homopolymer=0.27 mm/min
Dissolution rate for HEMAS homopolymer=0.1 mm/min
The results indicate that if every single side group is water soluble in an uncrosslinked polymer, the dissolution rate of the entire polymer in aqueous base is considerable.

Dissolution Study of Partially Deprotected Poly(tert-butyl methacrylate)

Formulation:
Poly(tert-butyl methacrylate) 18% in propylene glycol methyl ether acetate (PGMEA) with 0.5% PAG ((4-Phenoxyphenyl)diphenylsulfonium triflate)

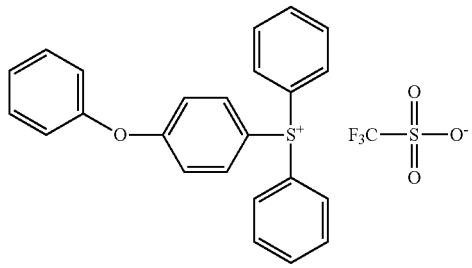 [SMILES: c1ccc(Oc2ccc([S+](c3ccccc3)c3ccccc3)cc2)cc1 ; O=S(=O)([O-])C(F)(F)F]

Experiment:
Spin coat the above solution on a glass slide
Bake entire film at 120° C. for 1 min to bake off the residual solvent
Expose half the film to Dymax 5000-EC flood lamp (mercury lamp with broad band light source) for 90 seconds
Bake entire film at 120° C. for 5 min
Develop by immersing in 0.5 N NaOH solution
Results: The film was delaminated in the developer and curled up, making it difficult to estimate the thickness. However, the unexposed region remained intact whereas the exposed film gradually dissolved in the developers (0.5 NaOH solution) after 1 hour.

The results indicate that the selective exposure of one portion of the polymer film to light that activates the PAG results in reaction and production of groups soluble in aqueous solution on the exposed portion of the polymer upon baking.

Another study was performed, starting with monomer, with the following formulation:

| COMPONENT | LOADING |
| --- | --- |
| tert-butyl methacrylate (Monomer) | 50% |
| TPO (diphenyl (2,4,6-trimethylbenzoyl)-phosphine oxide) (PI) | 0.5% |
| (4-Phenoxyphenyl)diphenylsulfonium triflate (PAG) | 1% |
| PGMEA (Solvent) | 48.5% |

Experiment
Irradiate composition with 385 nm LED light for 30 min to polymerize TBMA (observed viscosity increase)
Spin coat into film followed by baking at 120° C. for 1 min to remove solvent
Expose half of the film to Dymax 5000-EC flood lamp for 3 min
Bake at 120° C. for 5 min
Develop in 0.5 N NaOH
Measure thickness using a Mitutoyo height gauge
Results were as follows:

| Develop time | unexposed region | exposed region |
| --- | --- | --- |
| t = 0 | 6.5 μm | 6.5 μm |
| t = 30 min | 6.5 μm | 1.5 μm |

The results indicate that the selective exposure of one portion of the polymerized film to light that activates the incorporated PAG results in reaction and production of groups soluble in aqueous solution on the exposed portion of the polymer upon baking.

Dissolution Study of Polymer with Crosslinker having acid-labile groups

A resin was formed with an acid cleavable crosslinker, 2,5-dimethyl-2,5-hexanediol dimethacrylate (DHDMA), to cure into a solid polymer. The di-functional crosslinker was successfully synthesized.

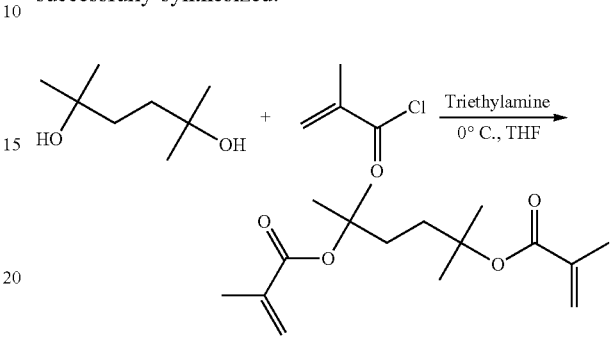

Tested formulations all exhibited swelling after acid-catalyzed cleavage of the ester, indicating cleavage of a portion of the crosslinkers, but did not completely dissolve. The formulation can be tuned to achieve dissolving in aqueous base by, e.g., adding carboxyl pendant monomers into the network, using less crosslinker, etc.

The foregoing is illustrative of the present invention, and is not to be construed as limiting thereof. The invention is defined by the following claims, with equivalents of the claims to be included therein.

That which is claimed is:

1. A method of forming a three-dimensional object intermediate comprising an acidic region, comprising the steps of:
    (a) providing a polymerizable liquid composition useful for additive manufacturing, comprising:
    (i) a free radical photoinitiator;
    (ii) monomers and/or prepolymers that are polymerizable by exposure to actinic radiation or light, optionally wherein some or all of said monomers and/or prepolymers comprise one or more acid-labile groups;
    (iii) a chain extender, optionally wherein said chain extender comprises one or more acid-labile groups; and
    (iv) a photoacid generator,
    wherein at least one of said monomers and/or prepolymers, or said chain extender, comprises one or more acid-labile groups, and
    wherein said free radical photoinitiator and said photoacid generator are, or are selected to be, activated by light at different ranges of wavelengths or intensities;
    (b) polymerizing a build region of said polymerizable liquid composition to form a crosslinked polymer, wherein said polymerizing is carried out by irradiating said polymerizable liquid with light at a first wavelength or intensity; and
    (c) activating the photoacid generator by further irradiating a portion of the build region intended or selected to be acidic with light at a second wavelength or intensity, whereby the photoacid generator produces acid in said portion of the crosslinked polymer to thereby form said acidic region, to thereby form said three-dimensional object intermediate comprising an acidic region, wherein said forming is carried out by bottom-up or top-down three-dimensional fabrication.

2. The method of claim 1, wherein said different ranges of wavelengths or intensities are selected such that there is a wavelength at which the free radical photoinitiator is activated and the photoacid generator is not activated.

3. The method of claim 1, wherein said free radical photoinitiator has an absorbance spectrum with a peak activation wavelength that is at least 5 nm or 10 nm apart from a peak activation wavelength in an absorbance spectrum of said photoacid generator.

4. The method of claim 1, wherein said monomers and/or prepolymers comprise one or more unsaturated vinyl groups and/or thiol groups.

5. The method of claim 1, wherein said polymerizable liquid composition comprises a blocked diisocyanate prepolymer.

6. The method of claim 1, wherein said chain extender comprises a diol.

7. The method of claim 1, wherein said polymerizable liquid composition comprises monomers and/or prepolymers comprising one or more acid-labile groups.

8. The method of claim 1, wherein said polymerizable liquid composition comprises a chain extender comprising one or more acid-labile groups.

9. The method of claim 1, wherein said one or more acid-labile groups comprise an orthoester, tertiary ester, acetal, ketal, hydrazone, imine, cis aconytil, trityl, silyl ester, carbamate, tert-butyloxycarbonyl, or tosyl group.

10. The method of claim 1, wherein said free radical photoinitiator is activated at wavelengths 250-600 nm or any sub-range therein, and said photoacid generator is activated at wavelengths 250-375 nm or any sub-range therein.

11. The method of claim 1, wherein said free radical photoinitiator is 2,4,6-trimethyl benzoyl, 2-benzyl-2-(dimethylamino)-1-[4-(4-morpholinyl) phenyl]-1-butanone, or diphenyl(2,4,6-trimethylbenzoyl)-phosphine oxide.

12. The method of claim 1, wherein said photoacid generator is an ionic photoacid generator, or a non-ionic photoacid generator.

13. The method of claim 1, wherein said polymerizable liquid composition comprises:
(i) from 0.1 to 10 percent by weight of said free radical photoinitiator;
(ii) from 1 to 90 percent by weight of said monomers and/or prepolymers;
(iii) from 1 to 50 percent by weight of said chain extender; and
(iv) from 0.1 to 10 percent by weight of said photoacid generator.

14. The method of claim 1, wherein said first wavelength or intensity is produced by a first light source, and said second wavelength or intensity is produced by a second light source, said first light source having an emission peak wavelength that is at least 5 or 10 nm apart from an emission peak wavelength of the second light source.

15. The method of claim 1, wherein said first wavelength or intensity and said second wavelength or intensity is produced by the same light source configured to produce a first or second emission peak wavelength that is at least 5 or 10 nm apart.

16. The method of claim 1, wherein said forming is carried out by additive manufacturing.

17. The method of claim 1, wherein said forming is carried out by continuous liquid interface production (CLIP).

18. The method of claim 1, further comprising the step of:
(d) heating the three-dimensional object intermediate to a temperature of from 40 degrees Celsius to 250 degrees Celsius, whereby the crosslinked polymer of said three-dimensional object intermediate further reacts with the chain extender to form a three-dimensional object, and acid of the acidic region reacts with the one or more acid-labile groups to form reacted groups.

19. The method of claim 18, wherein the reacted groups comprise polar or non-polar moieties, said moieties conferring a difference in solubility as compared to a non-acidic region of the three-dimensional object.

20. The method of claim 1, wherein said first wavelength or intensity and said second wavelength or intensity is produced by the same light source configured to produce a first or second emission peak wavelength that is at least 5 or 10 nm apart with UV filters and/or rapid lamp and/or mirror switching time.

21. A method of forming a three-dimensional object intermediate comprising an acidic region, comprising the steps of:
(a) providing a carrier and a build plate, said build plate comprising a build surface with said build surface and said carrier defining a build region therebetween;
(b) filling said build region with a polymerizable liquid composition useful for additive manufacturing, comprising:
(i) a free radical photoinitiator;
(ii) monomers and/or prepolymers that are polymerizable by exposure to actinic radiation or light, optionally wherein some or all of said monomers and/or prepolymers comprise one or more acid-labile groups;
(iii) a chain extender, optionally wherein said chain extender comprises one or more acid-labile groups; and
(iv) a photoacid generator,
wherein at least one of said monomers and/or prepolymers, or said chain extender, comprises one or more acid-labile groups, and
wherein said free radical photoinitiator and said photoacid generator are, or are selected to be, activated by light at different ranges of wavelengths or intensities, said polymerizable liquid composition contacting said build surface;
(c) polymerizing said polymerizable liquid composition to form a crosslinked polymer, wherein said polymerizing is carried out by irradiating said build region through said build plate with a light at a first wavelength or intensity to activate the free radical photoinitiator and crosslink the monomers and/or prepolymers, thereby forming a crosslinked polymer in said build region;
(d) activating the photoacid generator by further irradiating a portion of the build region intended to be acidic through said build plate with light at a second wavelength or intensity, whereby the photoacid generator produces acid in said crosslinked polymer to thereby form said acidic region; and
(e) advancing said carrier with said crosslinked polymer adhered thereto away from said build surface on said build plate to create a subsequent build region between said crosslinked polymer and said build surface;
to thereby form said three-dimensional object intermediate comprising an acidic region.

22. The method of claim 21, further comprising the step of:
(f) heating the acidic region of the three-dimensional object intermediate, wherein the crosslinked polymer of said three-dimensional object intermediate further reacts with the chain extender to form a three-dimensional object, whereby acid of the acidic region reacts with the one or more acid-labile groups to form reacted groups.

23. The method of claim 22, wherein the reacted groups comprise polar or non-polar moieties conferring a difference in solubility as compared to a non-acidic region of the three-dimensional object.

24. A method of forming a three-dimensional object intermediate comprising an acidic region, comprising the steps of:
(a) providing a carrier and a build plate, said build plate comprising a semipermeable member, said semipermeable member comprising a build surface with said build surface and said carrier defining a build region therebetween, and with said build surface in fluid communication by way of the semipermeable member with a source of polymerization inhibitor;
(b) filling said build region with a polymerizable liquid composition useful for additive manufacturing, comprising:
(i) a free radical photoinitiator;
(ii) monomers and/or prepolymers that are polymerizable by exposure to actinic radiation or light, optionally wherein some or all of said monomers and/or prepolymers comprise one or more acid-labile groups;
(iii) a chain extender, optionally wherein said chain extender comprises one or more acid-labile groups; and
(iv) a photoacid generator,
wherein at least one of said monomers and/or prepolymers, or said chain extender, comprises one or more acid-labile groups, and
wherein said free radical photoinitiator and said photoacid generator are, or are selected to be, activated by light at different ranges of wavelengths or intensities, said polymerizable liquid composition contacting said build surface;
(c) polymerizing said polymerizable liquid composition to form a crosslinked polymer, wherein said polymerizing is carried out by irradiating said build region through said build plate with light at a first wavelength or intensity to activate the free radical photoinitiator and crosslink the monomers and/or prepolymers in said build region, while forming or maintaining a liquid film release layer comprised of said polymerizable liquid composition formed between said crosslinked polymer and said build surface, wherein polymerization of the liquid film release layer is inhibited by said polymerization inhibitor;
(d) activating the photoacid generator by further irradiating a portion of the build region intended to be acidic through said build plate with light at a second wavelength or intensity, whereby the photoacid generator produces acid in said crosslinked polymer to thereby form said acidic region, while forming or maintaining the liquid film release layer comprised of said polymerizable liquid composition formed between said crosslinked polymer and said build surface, wherein polymerization of the liquid film release layer is inhibited by said polymerization inhibitor; and
(e) advancing said carrier with said crosslinked polymer adhered thereto away from said build surface on said build plate to create a subsequent build region between said crosslinked polymer and said build surface;
to thereby form a three-dimensional object intermediate comprising an acidic region.

25. The method of claim 24, further comprising the step of:
(f) heating the three-dimensional object intermediate, wherein the crosslinked polymer of said three-dimensional object intermediate further reacts with the chain extender to form a three-dimensional object, whereby acid of the acidic region reacts with the one or more acid-labile groups to form reacted groups.

26. The method of claim 25, wherein the reacted groups comprise polar or non-polar moieties conferring a difference in solubility as compared to a non-acidic region of the three-dimensional object.

* * * * *